US009444341B2

(12) United States Patent
Mellteg et al.

(10) Patent No.: US 9,444,341 B2
(45) Date of Patent: Sep. 13, 2016

(54) SWITCHED MODE POWER SUPPLY COMPENSATION LOOP

(71) Applicant: Telefonaktiebolaget L M Ericsson (publ), Stockholm (SE)

(72) Inventors: Magnus Mellteg, Kalmar (SE); Magnus Karlsson, Oskarshamn (SE); Daniel Nilsson, Älvängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 14/416,479

(22) PCT Filed: Dec. 1, 2014

(86) PCT No.: PCT/EP2014/076093
§ 371 (c)(1),
(2) Date: Jan. 22, 2015

(87) PCT Pub. No.: WO2015/149888
PCT Pub. Date: Oct. 8, 2015

(65) Prior Publication Data
US 2015/0303804 A1    Oct. 22, 2015

(30) Foreign Application Priority Data
Mar. 31, 2014 (WO) .................. PCT/EP2014/056441

(51) Int. Cl.
G06F 9/455 (2006.01)
G06F 17/50 (2006.01)
H02M 3/158 (2006.01)
H02M 3/156 (2006.01)
H02M 1/00 (2006.01)

(52) U.S. Cl.
CPC ............ H02M 3/158 (2013.01); H02M 3/156 (2013.01); *H02M 2001/0025* (2013.01)

(58) Field of Classification Search
CPC ........... H02M 3/157; H02M 7/53873; H02M 2001/0025; H02M 3/156; H02M 3/158
See application file for complete search history.

(56) References Cited

U.S. PATENT DOCUMENTS

| 7,586,767 B1* | 9/2009 | Prodic ................. H02M 3/157 323/282 |
| 2011/0063881 A1* | 3/2011 | Dabak ................. H02M 3/157 363/39 |

OTHER PUBLICATIONS

Morroni, J., et al., "Adaptive Tuning if Switched-Mode Power Supplies Operating in Discontinuous and Continuous Conduction Modes", IEEE Transactions on Power Electronics, Nov. 1, 2009, pp. 2603-2611, vol. 24, No. 11, IEEE.

*Primary Examiner* — Nha Nguyen
(74) *Attorney, Agent, or Firm* — Coats & Bennett, P.L.L.C.

(57) ABSTRACT

An apparatus (200) for tuning a feedback loop that is arranged to regulate an output voltage ($V_{out}$) of a switched mode power supply, SMPS (100), in accordance with a control law defined by control law parameters. The apparatus includes a natural frequency estimator (210) arranged to determine a respective estimate of a natural frequency of each of two zeros in a transfer function that corresponds to a model of the feedback loop. The natural frequency estimator (210) comprises: an output voltage deviation determining module (212) arranged to determine, for each of a plurality of points in a search space, wherein the coordinates of each of the points correspond to candidate values of the natural frequencies of the zeros, a deviation of the output voltage of the SMPS that occurs in response to a variation in a load current of the SMPS; and a goal function evaluation module (214) arranged to evaluate a goal function using the determined deviation of the output voltage of the SMPS at each of the plurality of points to obtain a measure of at least one of a size and a recovery time of the respective output voltage deviation. The natural frequency estimator (210) is arranged to estimate a location of a minimum of the goal function in the search space based on the evaluated values of the goal function, the location of the minimum corresponding to the natural frequencies of the zeros. The apparatus further comprises a control law parameter calculator (220) arranged to calculate, based on the determined estimates of the natural frequencies of the zeros, the control law parameters for tuning the feedback loop, and a feedback loop tuner (230) to tune the feedback loop in accordance with the calculated control law parameters.

35 Claims, 21 Drawing Sheets

SWITCHED MODE POWER SUPPLY COMPENSATION LOOP

TECHNICAL FIELD

The present invention generally relates to the field of switched mode power supplies (sometimes referred to as switch mode power supplies or switching mode power supplies) and more specifically to the determination of control law parameter values for tuning the compensation loop employed in a regulated switched mode power supply.

BACKGROUND

The switched mode power supply (SMPS) is a well-known type of power converter having a diverse range of applications by virtue of its small size and weight and high efficiency, for example in personal computers and portable electronic devices such as cell phones. A SMPS achieves these advantages by switching one or more switching elements such as power MOSFETs at a high frequency (usually tens to hundreds of kHz), with the frequency or duty cycle of the switching being adjusted by a feedback loop (also widely referred to as a "compensation loop" or "feedback circuit") to convert an input voltage to a desired output voltage. A SMPS may take the form of a rectifier (AC/DC converter), a DC/DC converter, a frequency changer (AC/AC) or an inverter (DC/AC).

The feedback loop typically comprises a controller that regulates the switching frequency or the switching duty cycle of the switching element(s) of the SMPS based on the output voltage or output current of the SMPS, in accordance with a control law defined by one or more control law parameters, to keep the output voltage of the SMPS in the vicinity of a predetermined value. For example, the SMPS may comprise a Proportional-Integral-Derivative (PID) controller that regulates the duty cycle (or the switching frequency, as the case may be) of the switching element(s) to keep the output voltage of the SMPS constant, in accordance with a PID control law that is characterised by the values of the P, I and D control parameters set in the PID controller.

When designing a digital compensation loop for a SMPS, use is often made of standard design tools that consider the design in the frequency domain, which can provide useful indications of system stability or robustness for plant changes and modelling errors. In this case, loop compensation is typically designed using rules of thumb for placing the PID compensation zeros, normally at the pole's natural frequency and one octave below. However, this approach usually requires the designer to have a good understanding of the system at hand, and in many cases yields sub-optimal solutions. Other approaches are based essentially on trial and error, which can be very time-consuming.

SUMMARY

The present inventors have realised that, besides the above-mentioned shortcomings of conventional approaches to determining the parameters for tuning SMPS compensation loops, these approaches also have the disadvantage of providing the designer with little information regarding the SMPS's response to load transients, which is another important design goal. Load transient performance has conventionally been optimised by appropriately designing the decoupling capacitor bank of the SMPS. However, the tasks of achieving these design goals are not unrelated as the decoupling capacitors affect the SMPS dynamics and thus influence compensation loop behaviour.

The present inventors have conceived a scheme of determining values of control law parameters for tuning the feedback loop of a SMPS that can optimise load transient performance. As will be explained in the following, the parameter determination algorithms devised by the inventors employ new goal functions which can be configured to emphasise different objectives in the optimisation.

This contrasts with conventional approaches summarised above, where load transient behaviour is usually considered when designing the control loop only to the extent that the well-known result, that a phase margin of 60 degrees yields a well-behaved load transient, is used.

More specifically, the inventors have devised a method of determining values of control law parameters for tuning a feedback loop that is arranged to regulate an output voltage of a SMPS in accordance with a control law defined by the control law parameters. The method comprises determining a respective estimate of a natural frequency of each of two zeros in a transfer function that corresponds to a model of the feedback loop by: determining, for each of a plurality of points in a search space, wherein the coordinates of each of the points correspond to candidate values of the natural frequencies of the zeros, a deviation of the output voltage of the SMPS that occurs in response to a variation in a load current of the SMPS; evaluating a goal function using the determined deviation of the output voltage of the SMPS at each of the plurality of points to obtain a measure of at least one of a size and a recovery time of the respective output voltage deviation; and estimating a location of a minimum of the goal function in the search space based on the evaluated values of the goal function, the location of the minimum of the goal function corresponding to the natural frequencies of the zeros. The method further comprises calculating, based on the determined estimates of the natural frequencies of the zeros, the control law parameter values for tuning the feedback loop.

The inventors have further devised a computer program product, comprising a signal or a non-transitory computer-readable storage medium carrying computer program instructions which, when executed by a processor, cause the processor to perform a method as set out above.

The inventors have further devised an apparatus for determining values of control law parameters for tuning a feedback loop that is arranged to regulate an output voltage ($V_{out}$) of a SMPS in accordance with a control law defined by the control law parameters. The apparatus comprises a natural frequency estimator arranged to determine a respective estimate of a natural frequency of each of two zeros in a transfer function that corresponds to a model of the feedback loop. The natural frequency estimator comprises: an output voltage deviation determining module arranged to determine, for each of a plurality of points in a search space, wherein the coordinates of each of the points correspond to candidate values of the natural frequencies of the zeros, a deviation of the output voltage of the SMPS that occurs in response to a variation in a load current of the SMPS; and a goal function evaluation module arranged to evaluate a goal function using the determined deviation of the output voltage of the SMPS at each of the plurality of points to obtain a measure of at least one of a size and a recovery time of the respective output voltage deviation. The natural frequency estimator is arranged to estimate a location of a minimum of the goal function in the search space based on the evaluated values of the goal function, the location of the minimum of the goal function corresponding to the natural frequencies of the zeros. The apparatus further comprises a control law parameter calculator arranged to calculate, based on the determined estimates of the natural frequencies of the zeros, the control law parameter values for tuning the feedback loop.

The inventors have further devised a switched mode power supply comprising a feedback loop that is arranged to regulate an output voltage of a switched mode power supply in accordance with a control law defined by control law parameters, and an apparatus as set out above.

BRIEF DESCRIPTION OF THE DRAWINGS

Embodiments of the invention will now be explained in detail, by way of example only, with reference to the accompanying figures, in which:

FIGS. 6A to 6C show experimental results that are helpful for understanding the process illustrated in FIG. 7;

DETAILED DESCRIPTION OF EMBODIMENTS

Embodiment 1

Figure 1:
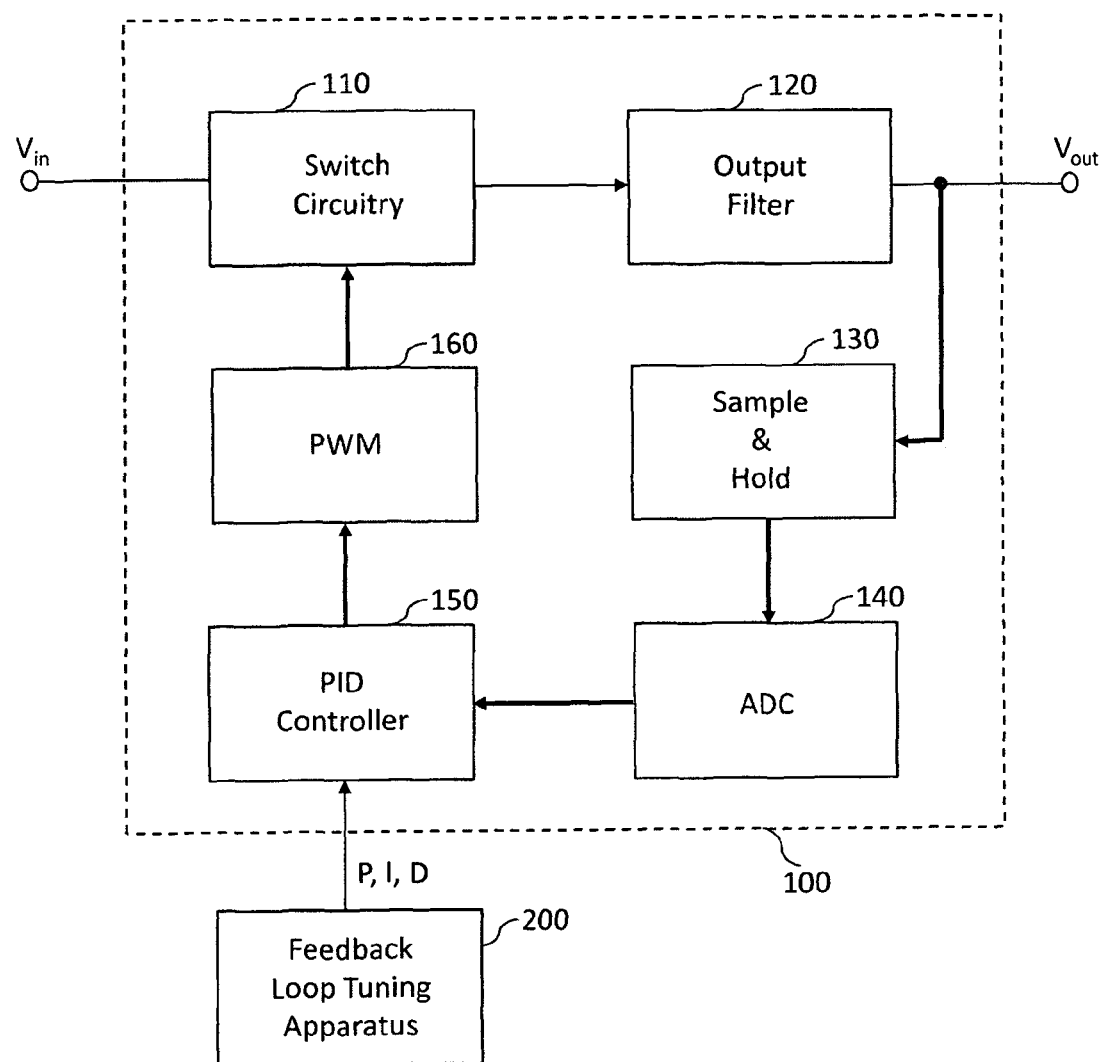
FIG. 1 is schematic illustration of a feedback loop tuning apparatus according to an embodiment of the present invention that is arranged to tune the feedback loop of a SMPS.

FIG. 1 is a schematic showing components of a SMPS 100 that are helpful for understanding the present invention, together with an apparatus 200 for determining values of control parameters for tuning the feedback loop of the SMPS 100.

In the present embodiment, the SMPS 100 comprises switch circuitry 110 comprising at least one switching element (e.g. MOSFET) that is arranged in the switch circuitry 110 and controlled to switch at a high frequency (e.g. tens to hundreds of kHz) and with a duty cycle so as to convert an input DC voltage $V_{in}$ of the SMPS 100 to an output voltage, which is filtered by a low-pass filter 120 of the SMPS (e.g. a first order LC filter comprising an inductor and one or more capacitors) to generate an output a DC voltage, $V_{out}$, of the SMPS 100. The switch circuitry 110 may, as in the present embodiment, include an isolation transformer having a primary winding driven by a primary side circuit, and a secondary winding electromagnetically coupled to the primary winding and arranged to drive a secondary side circuit typically comprising a rectifying network, the one or more switching elements being provided in one or both of the primary and secondary side circuits. Suitable circuit topologies and other details of the switch circuitry 110, as well as details of the output filter 120, are well-known to those skilled in the art and will therefore not be described here.

The SMPS 100 further comprises a feedback loop which is arranged to regulate the output voltage $V_{out}$ of the SMPS 100 in accordance with a control law that is characterised by one or more control law parameters. The feedback loop may, as in the present embodiment, be implemented digitally and thus include a sample and hold circuit 130 arranged to sample $V_{out}$ or a signal indicative thereof (e.g. at intervals of 1 to 10 microseconds) and temporarily store the sampled values in a buffer, and an analog-to-digital converter (ADC) 140-which is arranged to digitise the stored sample values. Analog implementations of the feedback loop are, of course, also possible.

In the present embodiment, the feedback loop also includes a PID regulator (also referred to herein as a PID controller) 150 that regulates the duty cycle (or the switching frequency, as the case may be) of the switching element(s) to keep the output voltage of the SMPS 100 constant, on the basis of received indications of $V_{out}$ (i.e. the sample values from the ADC 140 in the present example) and in accordance with a PID control law that is characterised by the values of the P, I and D control parameters set in the PID regulator 150. However, in alternative embodiments, another kind of regulator, which regulates $V_{out}$ in accordance with a different control law that is defined using a different set of one or more control law parameters, may be used in place of the PID regulator 150. The PID regulator 150 is arranged to generate control signals to control a pulse width modulator (PWM) 160 also included in the feedback loop, to appropriately control the switching of the switching element(s) in the switch circuitry 110. The functionality of the components of the feedback loop illustrated in FIG. 1, and alternative ways of implementing and distributing these components among the primary and secondary sides of the isolation barrier of the SMPS 100 (where one is provided, as in the present embodiment), will be familiar to those skilled in the art, such that it is unnecessary to provide further details here.

In the example of FIG. 1, an apparatus 200 according to a first embodiment of the present invention is provided to determine values of control law parameters for tuning the feedback loop of the SMPS 100. The apparatus 200 may, as in the present embodiment, be provided as a stand-alone product that may be provided and sold separately from the SMPS 100 but preferably operable, as in the present embodiment, to communicate with the SMPS 100 by any suitable means (e.g. using the PMBus protocol in the case of a SMPS with a digital PMBus interface) so as to tune one or more of the P, I and D values of the PID regulator 150 (or a different set of control parameters, such as the coefficients for the second order section, or the zeros $z_{zero1}$ and $z_{zero2}$, and the gain G mentioned below).

Figure 2:
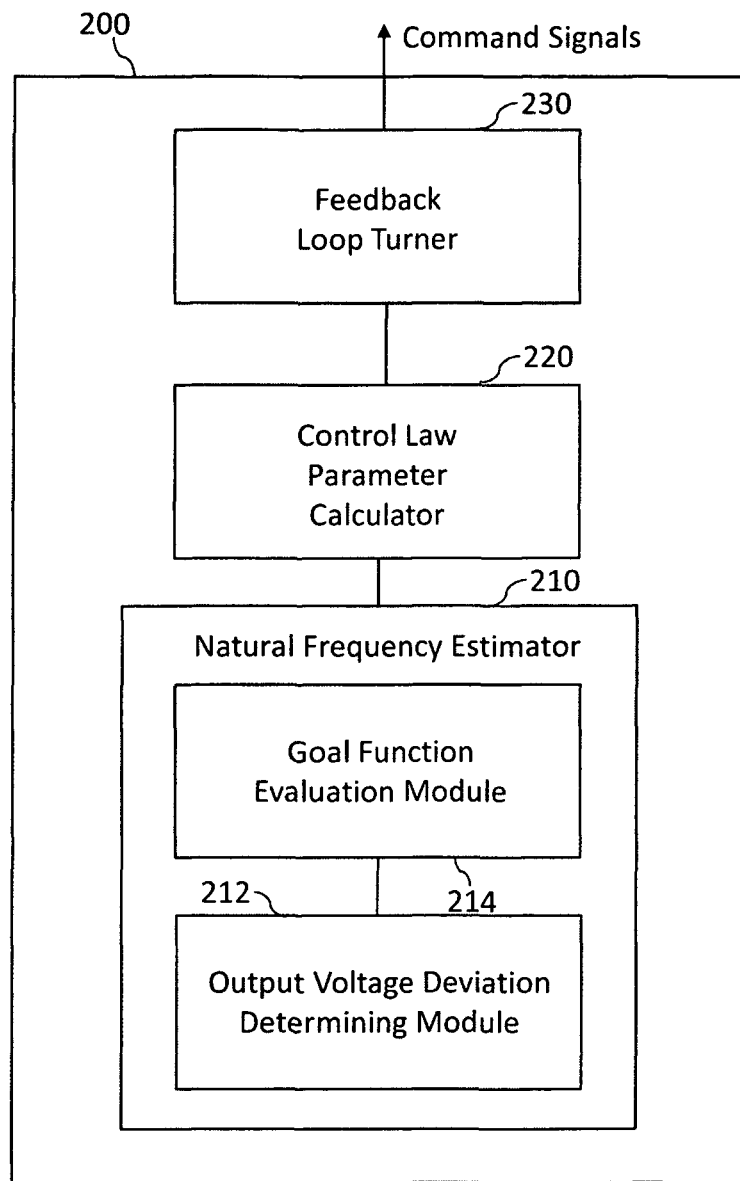
FIG. 2 illustrates functional components of the feedback loop tuning apparatus shown in FIG. 1.

FIG. 2 shows function components of the apparatus 200 of the present embodiment. The apparatus 200 comprises a natural frequency estimator 210 having an output voltage deviation determining module 212 and a goal function evaluation module 214, as well as a control law parameter calculator 220 and (optionally) a feedback loop tuner 230, which are functionally inter-connected as shown. Where the apparatus 200 includes a feedback loop tuner 230, as in the present embodiment, it functions as a feedback loop tuning apparatus to tune the feedback loop of the SMPS 100 according to determined values of the control law parameters. However, where the apparatus 200 does not include such a feedback loop tuner 230, the determined control parameter values may be output to a user for manual tuning of the feedback loop. The functionality of these components of the apparatus 200 will be described in detail below.

Figure 3:
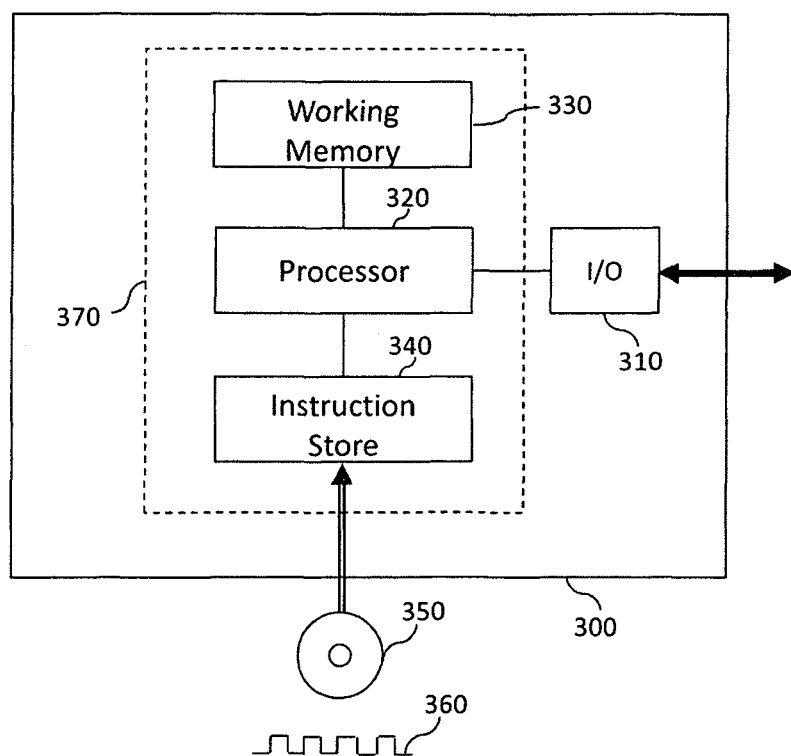
FIG. 3 shows an exemplary hardware implementation of the feedback loop tuning apparatus shown in FIG. 2.

FIG. 3 shows an exemplary implementation of the feedback loop tuning apparatus 200, in programmable signal processing hardware. The signal processing apparatus 300 shown in FIG. 3 comprises an input/output (I/O) section 310 for transmitting control signals to the PID controller 150 to set values of its P, I and/or D control parameters. The signal processing apparatus 300 further comprises a processor 320, a working memory 330 and an instruction store 340 storing computer-readable instructions which, when executed by the processor 320, cause the processor 320 to perform the processing operations hereinafter described to calculate values of the control law parameters, and generate, control signal indicating the calculated control law parameter values, in accordance with which the feedback loop is to regulate the output voltage $V_{out}$ of the SMPS 100. The instruction store 340 may comprise a ROM which is pre-loaded with the computer-readable instructions. Alternatively, the instruction store 340 may comprise a RAM or similar type of memory, and the computer readable instructions can be input thereto from a computer program product, such as a computer-readable storage medium 350 such as a CD-ROM, etc. or a computer-readable signal 360 carrying the computer-readable instructions.

In the present embodiment, the combination 370 of the hardware components shown in FIG. 3, comprising the processor 320, the working memory 330 and the instruction store 340, is configured to implement the functionality of the aforementioned natural frequency estimator 210, control law parameter calculator 220 and the feedback loop tuner 230, which will now be described in detail with reference to FIGS. 4 to 7.

Figure 4:
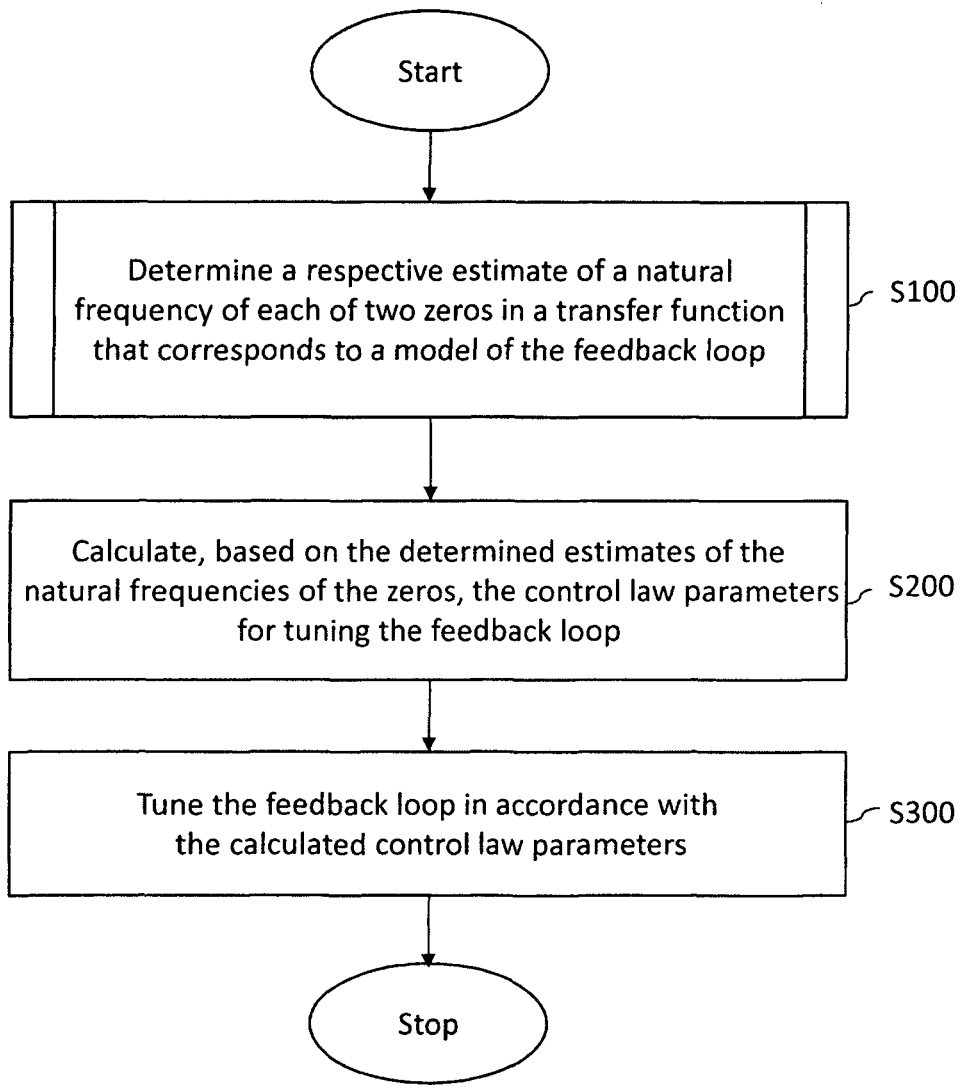
FIGS. 4 and 5 are flow diagrams illustrating a method of tuning the feedback loop of a SMPS.
Figure 5:
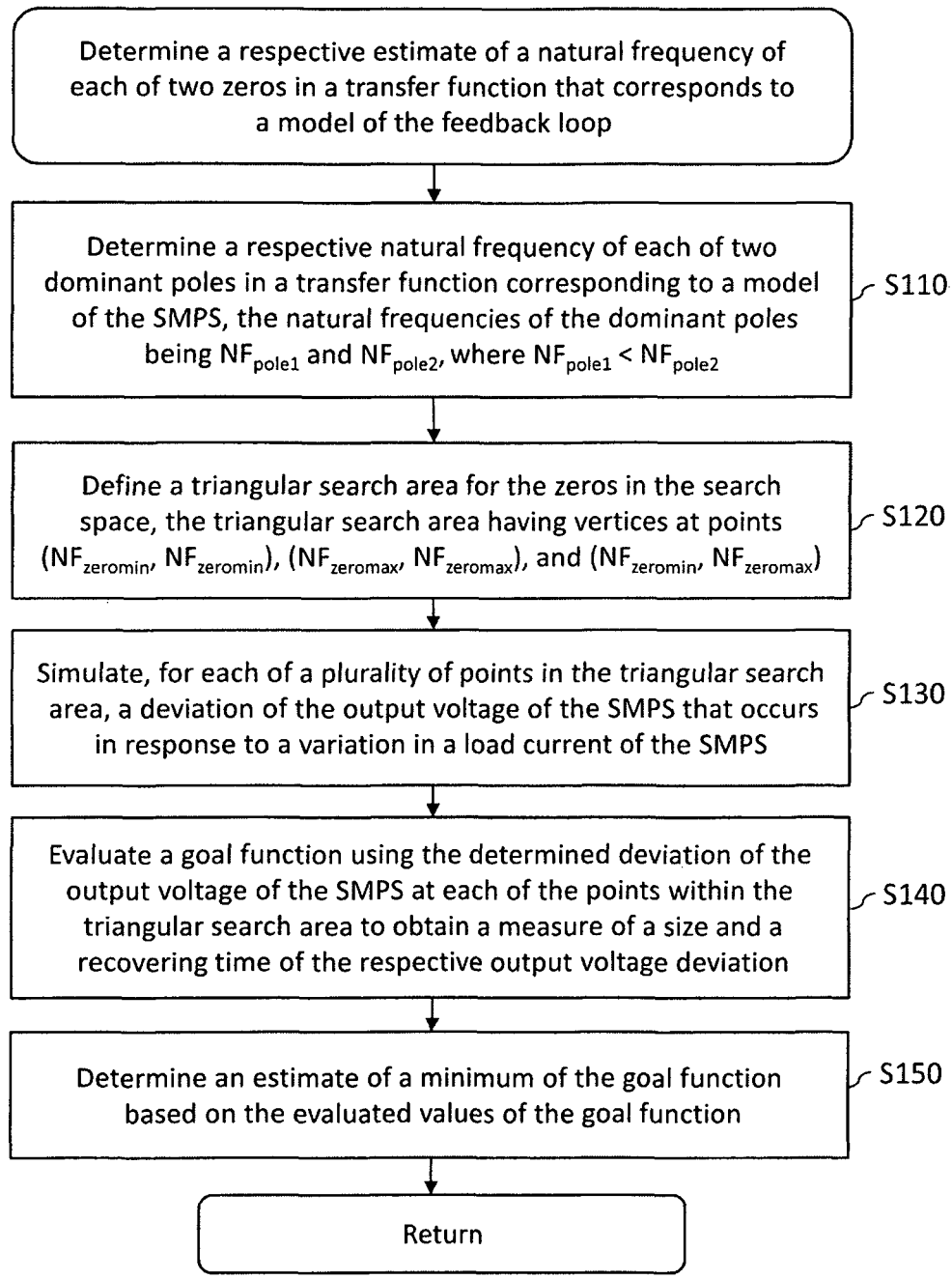

FIGS. 4 and 5 are flow charts illustrating a process by which the feedback loop tuning apparatus 200 tunes the feedback loop of the SMPS 100 in the present embodiment.

FIG. 4 provides a top-level illustration of the loop tuning process. In step S100 of FIG. 4, the natural frequency estimator 210 determines a respective estimate of a natural frequency of each of two zeros in a transfer function associated with a mathematical model of the feedback loop of the SMPS 100. In the present embodiment, the feedback loop is modelled to implement PID control law, which is widely used in industry. However, it will be appreciated that the techniques described herein are applicable to other kinds of control law.

A digital implementation of PID control may employ a second order direct-form I (DF-I) section, which implements the following transfer function:

$$PID(z) = G\frac{(z-z_{zero1})(z-z_{zero2})}{z-1},$$

where the two zeros realise the D-part, and the integrator I is implemented with a pole at +1 in the z-plane. The gain level is set by the factor G. In the present embodiment, the transfer function thus has two compensation zeros that should be placed properly since they affect the load transient behaviour, while the gain factor G should be set so that the open loop system reaches design robustness goals in terms of phase and gain margins.

It should be noted that, if the model of the SMPS is of a higher order than two, a model reduction technique, such as Balanced model reduction, which uses Hankel singular values, is preferably used to reduce the order to two. However, any other suitable model reduction technique may alternatively be used.

In brief, in step S100, the natural frequency estimator 210 determines, for each of a plurality of points in a search space, wherein the coordinates of each of the points correspond to candidate values of the natural frequencies of the zeros, a deviation of the output voltage $V_{out}$ of the SMPS 100 from an initial value that occurs in response to a variation in a load current of the SMPS 100. The natural frequency estimator 210 then evaluates a novel goal function, G, devised by the present inventors at each of the plurality of points, using the determined deviation of $V_{out}$, wherein the evaluated goal function G provides a measure of at least one of a size and a recovery time of the respective output voltage variation. Based on the evaluated values of the goal function G, the natural frequency estimator 210 then estimates the location of a minimum of the goal function G in the search space using any suitable algorithm known to the skilled person (e.g. the steepest descent method, Newton's method using Jacobean matrix of gradient, conjugated gradient method, Broyden-Fletcher-Goldfarb-Shannon (BFGD) method etc.). The location of the goal function minimum corresponds to the natural frequencies of the zeros. Examples of suitable goal functions and further details of the processes summarised above, as well as a particularly efficient search algorithm which has been devised by the present inventors, will be described below.

In step S200, the control law parameter calculator 220 calculates, based on the estimates of the natural frequencies of the zeros determined by the natural frequency estimator 210, the control law parameters for tuning the feedback loop.

Finally, in an optional step S300, the feedback loop tuner 230 tunes the feedback loop in accordance with the control law parameters calculated by the control law parameter calculator 220.

The procedure by which the natural frequency estimator 210 determines estimates of the natural frequency of each of two zeros in the transfer function of the feedback loop in the present embodiment will now be described in more detail with reference to FIG. 5.

The zeros' phase lead compensates for the phase lag from the poles of a transfer function derived from a model of the SMPS (described further below). Hence, important input data for the optimisation process described herein are the natural frequencies for the SMPS poles, as these limit the search range for the zeros' natural frequencies, as will be described further below. To a good approximation, the zero's phase lead starts one decade below its natural frequency, and yields its maximum one decade above. Thus, a larger range than that is normally unnecessary to investigate. Experiments conducted by the inventors have shown that the search range can be further limited to +/−1 octave around the poles' natural frequencies in the SMPS.

Thus, in step S110, the natural frequency estimator 210 preferably determines a respective natural frequency of each of two dominant poles in a transfer function corresponding to a model of the SMPS 100, the natural frequencies of the dominant poles being $NF_{pole1}$ and $NF_{pole2}$, where $NF_{pole1} \leq NF_{pole2}$. This may be achieved by building a mathematical model of the SMPS 100 including the decoupling filter 120, using techniques and software tools well-known to those skilled in the art. A piece-wise linear model is preferably used, which comprises one linear model for each switching phase of operation of the SMPS. As an example, for a buck converter working in continuous conduction mode (CCM), two different models are sufficient, one corresponding to the case when the switching element is conducting, and the other when the sync/rectification switching element is conducting. The piece-wise linear model is time-averaged in order to obtain a linear model that can be transformed into the frequency domain, so that the dominating pole frequencies can be obtained from that model.

Where step S110 has been performed, the natural frequency estimator 210 preferably defines in step S120 a triangular search area for the zeros in a search space which, as noted above, can be regarded as a two-dimensional space wherein the coordinates ($NF_{zero1}$, $NF_{zero2}$) of each point correspond to a pair of candidate values, namely $NF_{zero1}$ and $NF_{zero1}$, that the natural frequencies of the zeros may take. The triangular search area has vertices at point ($NF_{zeromin}$, $NF_{zeromin}$), ($NF_{zeromax}$, $NF_{zeromax}$), and either ($NF_{zeromin}$, $NF_{zeromax}$) or ($NF_{zeromax}$, $NF_{zeromin}$) where $NF_{zeromin} = NF_{pole1}/r_{min}$ and $NF_{zeromax} = NF_{pole2} \cdot r_{max}$. In these expressions, $r_{min}$ and $r_{max}$ are range factors and are each preferably between 1.5 and 3. Moreover, the inventors have found that setting $r_{min} = r_{max} = 2$, so as to search one octave above and one octave below the natural frequencies of the poles, allows good estimates for the zeros' natural frequencies to the found efficiently. Simulations of many common and extreme SMPS systems performed by the inventors have confirmed that optimal load transient response is obtained for values of the zeros' natural frequencies lying within either of the triangles whose vertices are identified above. In this connection, it is noted that, since the compensation does not depend on the order of the zeros, the search space which needs to be searched to find estimates of the zeros' natural frequencies can be limited to either of these triangles.

In step S130, an output voltage deviation determining module 212 determines, for each of a plurality of points in the search space, a deviation of $V_{out}$ that occurs in response to a variation in a load current of the SMPS 100. Where optional steps S110 and S120 have been performed, the output voltage deviation determining module 212 simulates in step S130, for each of the plurality of points in the triangular search area defined in step S120, how $V_{out}$ deviates from its initial value (corresponding to an initial value of the SMPS load current) in response to the variation in the load current of the SMPS 100 from the initial load current value. This simulation is performed using the model of the SMPS 100 and the model of the feedback loop of the SMPS 100.

Figure 6:
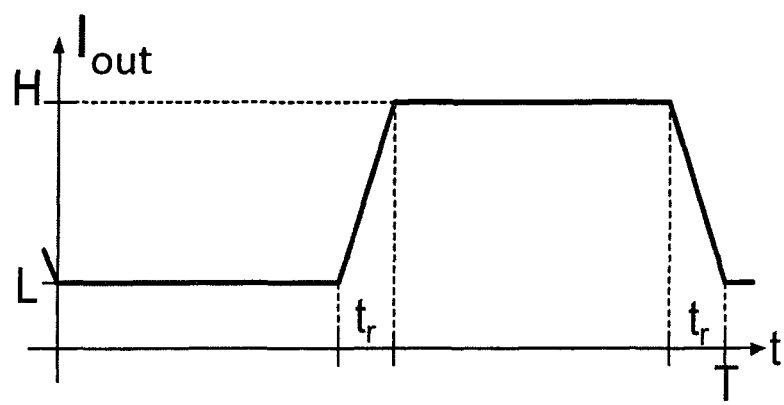
FIG. 6 schematically illustrates the form of a load current transient used in a simulation of the response of the SMPS described herein.

An example of a load transient used in the simulation is illustrated in FIG. 6. As shown in FIG. 6, the load current increases from a low level, L, to a high level, H, over a period of time $t_r$, giving a slew rate of $(H-L)/t_r$. The load transient switch period T is, for example, 1-3 milliseconds. The time period T thus covers many switching cycles of the switching element(s) of the SMPS, which have a switching period of 1-10 microseconds.

The simulation of the load transient response is performed using piece-wise linear differential equation (DE) models. That is, one DE model is used in each working region of the SMPS, and the models are switched when entering another working region. The final state of the state-variables becomes the initial state for the new model. The simulation can be implemented in any suitable modelling software, such as MATLAB™ or Modellica™.

Referring again to FIG. 5, in step S140, the goal function evaluation module 214 evaluates a goal function G using the determined deviation of $V_{out}$ at each of the plurality of points within the triangular search area to obtain a measure of at least one of a size and a recovery time of the respective output voltage deviation. Following a load transient, $V_{out}$ may deviate from an initial value (at which it was before the load transient occurred) to a maximum or minimum value, before decaying back towards its initial value. The goal function G provides a measure of at least one of the maximum SMPS output voltage deviation (e.g. the voltage overshoot observed) during the variation in load current of the SMPS 100, and a recovery time during which $V_{out}$ returns to within a tolerance band of output voltage values (e.g. centred on the initial value of $V_{out}$, before the load transient occurs) following the variation in the load current of the SMPS 100. The boundaries of the tolerance band usually lie a few percent (normally 1-3 percent) above and below the initial output voltage value, and the recovery time corresponds to the time taken by the output voltage to reach either of these boundaries following the occurrence of a load transient. The goal function may be defined as a weighted average of the voltage deviation and the recovery time, for example in the following general form:

$$w_{Vdev}\left[\frac{V_{Dev}}{V_{Dev\_Req}}\right]^N + w_R\left[\frac{T_R}{T_{R\_Req}}\right]^M,$$

wherein $V_{dev}$ denotes the maximum SMPS output voltage deviation, $T_R$ denotes the recovery time, $V_{Dev\_Req}$ and $T_{R\_Req}$ are normalization factors (in other words, the voltage deviation and recovery time requirements selected by the user) required to allow the voltage deviation and the recovery time to be weighted properly, $w_{Vdev}$ and $w_R$ are weighting factors, and N and M are integers with $N \geq 1$ and $M \geq 1$. $V_{Dev\_Req}$ and $T_{R\_Req}$ may correspond to the maximum permitted voltage deviation and the longest allowed recovery time selected by the user, respectively.

However, calculation of the recovery time $T_R$ may be time-consuming, and choosing the recovery level, tolerance band, may be difficult and affect the results significantly. It may therefore be preferable to use a standard Norm of the signal, equal to the voltage deviations from the DC level during the transient. A goal function of the following general form may be used in such circumstances:

$$[\int_0^{T_{trans}} |V_{out}(t) - V_{DC}|^N dt]^{1/N},$$

wherein $V_{out}(t)$ denotes the variation in $V_{out}$ that occurs in response to the variation in the load current of the SMPS, $T_{trans}$ denotes the duration of the variation in the load current of the SMPS 100, $V_{DC}$ denotes a DC voltage from which $V_{out}$ deviates in response to the variation in the load current of the SMPS, and N is an integer greater than or equal to 1.

Thus, N=1 yields an integral of the absolute value of the deviation, N=2 corresponds to the energy norm, while high values of N yield $$\|V_{out}(t) - V_{DC}\|_\infty = \sup_t |V_{out}(t) - V_{DC}|,$$

i.e. the maximal voltage deviation. Hence, by varying the factor N, the relative weightings of the voltage deviation and the recovery time can be varied.

The integral must be calculated using a numerical approximation algorithm, such as a first order approximation as shown below, or a trapezoidal second order approximation:

$$\int_o^{T_{trans}} |V_{out}(t) - V_{DC}|^N dt \approx \sum_{k=1}^{T_{trans}/\Delta t} |V_{out}(k\Delta t) - V_{DC}|^N \Delta t$$

In step S150, the natural frequency estimator 210 estimates a location of a minimum of the goal function G in the triangular search area based on the evaluated values of the goal function, for example using one of the techniques described above.

Although steps S130 and S140 may be performed sequentially on a set of points in the search area (which may, for example, be arranged in a grid) which defines all of the candidate values of the zeros' natural frequencies to be considered in the estimation of the goal function minimum, steps S130 and S140 are preferably performed sequentially on one point at time during an iterative search process, wherein a new candidate point that provides a better estimate of the goal function minimum is generated in each iteration of the search process.

An example of such a search process which has been devised by the present inventors, and which provides a particularly efficient implementation of steps S130 to S150, will now be described with reference to FIG. 7.

In step S410, the natural frequency estimator 210 calculates the deviation of $V_{out}$ and an associated value of the goal function G for each of the vertices of the triangular search area.

In step S420, the natural frequency estimator 210 replaces the vertex of the triangular search area yielding the greatest value of the goal function G with a vertex within the search area that yields a smaller value of the goal function G to generate a triangle within the search area that is defined by the vertex within the search area and the remaining vertices of the triangular search area.

In step S430, the natural frequency estimator 210 set the value of a program loop counter j to an initial value of 1.

In step S440, the natural frequency estimator 210 calculates the deviation of $V_{out}$ for the new vertex and evaluates the goal function G for the new vertex.

In step S450, the natural frequency estimator 210 replaces the vertex of the triangle yielding the greatest value of the goal function G with a new vertex within the search area that yields a smaller value of the goal function G to generate a new triangle within the search area.

In step S460, the natural frequency estimator 210 updates the value of the loop counter j by incrementing it by 1, and determines whether the updated value of the loop counter j is equal to a threshold value J. Thus, the stopping criterion for stopping the repeated performance of steps S440 and S450 is that a predetermined number J of loop iterations have been performed. In some practical implementations of this search method, the inventors have found that J=15 to 25 is sufficient. However, it should be noted that other stopping criteria, which may relate to the degree of convergence of the search, may alternatively be used. For example, the algorithm may be modified to break out of the loop defined by steps S440 to S460 when the triangle becomes smaller than a predetermined size, e.g. such that the natural frequencies defined by the coordinates of its vertices differ by less than a predetermined amount, e.g. 10 to 20 Hz.

When the stopping criterion has been met (in this example, when the loop counter j reaches the threshold value of J), the process proceeds to step S470, wherein the natural frequency estimator 210 estimates the location of the minimum of the goal function within the search area based on the evaluated values of the goal function to obtain an estimate of the natural frequencies of the zeros. For example, the natural frequency estimator 210 may select a point in or on the triangle generated in the final performance of step S450, e.g. one of the vertices of the triangle, preferably the vertex giving the lowest value of the goal function. The natural frequency estimator 210 may alternatively select a point in or on the triangle generated in the penultimate (or an even earlier) performance of step S450, although less preferably. In each of these cases, the coordinates of the selected point provide the estimate of the natural frequencies of the zeros.

Thus, the numerical optimisation algorithm described above (which is based on the Nelder-Mead method) may be regarded as a pattern search that compares function values at the three vertices of a triangle. The worst vertex, where goal function G is largest, is rejected and replaced with a new vertex. A new triangle is formed and the search is continued. The process generates a sequence of triangles (which might have different shapes), for which the function values at the vertices get smaller and smaller. The size of the triangles is reduced and the coordinates of a point in the search space approximating the minimum of the goal function are eventually found. However, in contrast to the Nelder-Mead method, which allows the search to extend outside the initial triangle considered in the search, the search method described herein includes the restriction that the smaller triangles generated during the course of the method must all lie within the starting triangle, i.e. within the triangular search area. In other words, no new vertex generated during the search is allowed to be placed outside the bounds of the initial triangular search area. Further details of the Nelder-Mead method and variants thereof may be found in "A simplex method for function minimization" by J. A. Nelder and R. Mead, Computer Journal, Vol. 7, Issue 4, pages 308-313 (Oxford Journals, 1965), and many text books on numerical methods. These methods may be modified in a straight-forward way to incorporate the further restriction discussed above, in order to obtain an algorithm of the more general form described above with reference to FIGS. 4-5 and 7. This algorithm has the advantage that it does not require the calculation of any derivatives, which may be computationally expensive, and focuses the search to the relevant part of the search area, thus making it more efficient.

Figure 7:
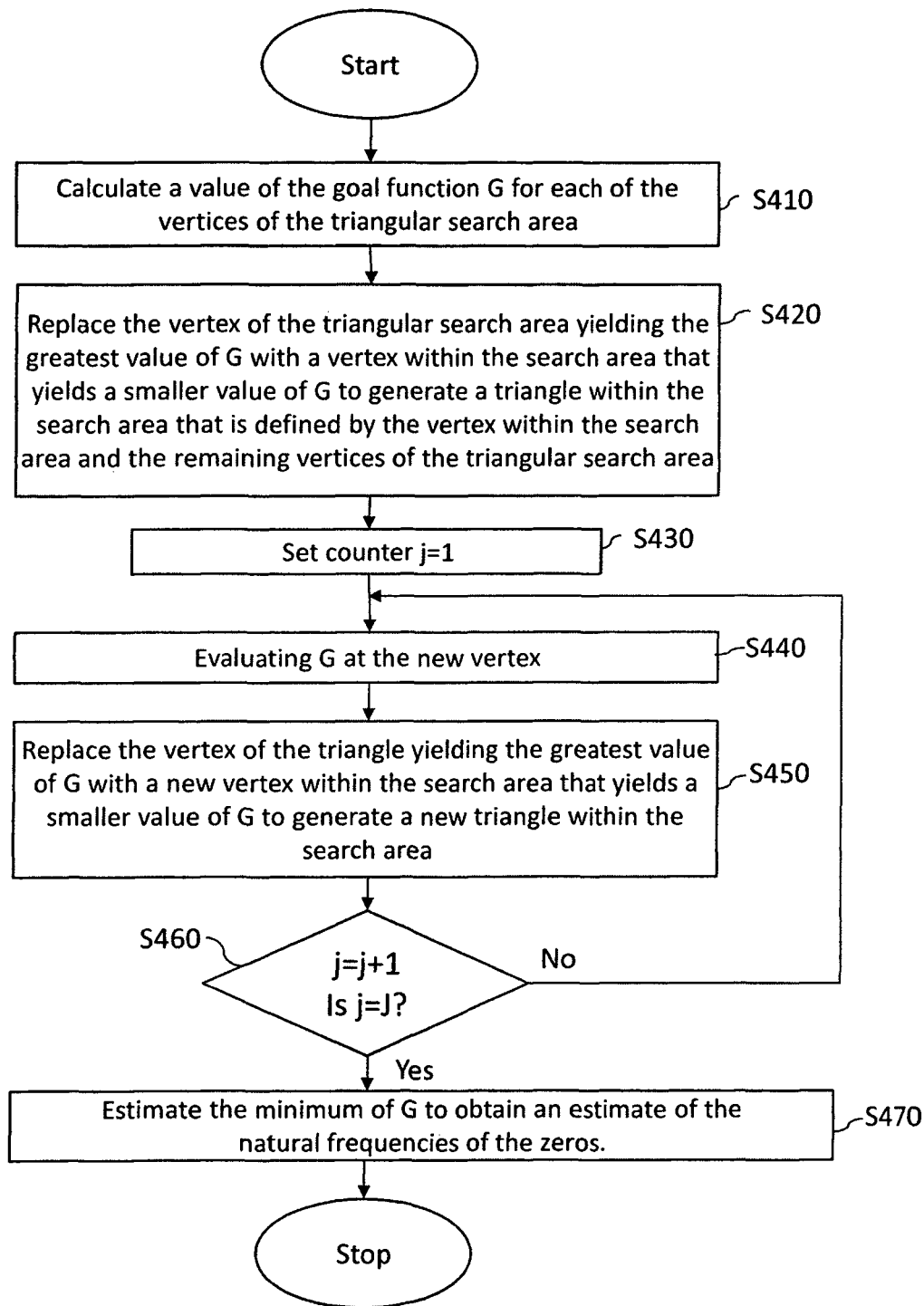
FIG. 7 is a flow diagram illustrating a process for estimating the location of a minimum of a goal function used in the tuning of the feedback loop.
Figure 8A:
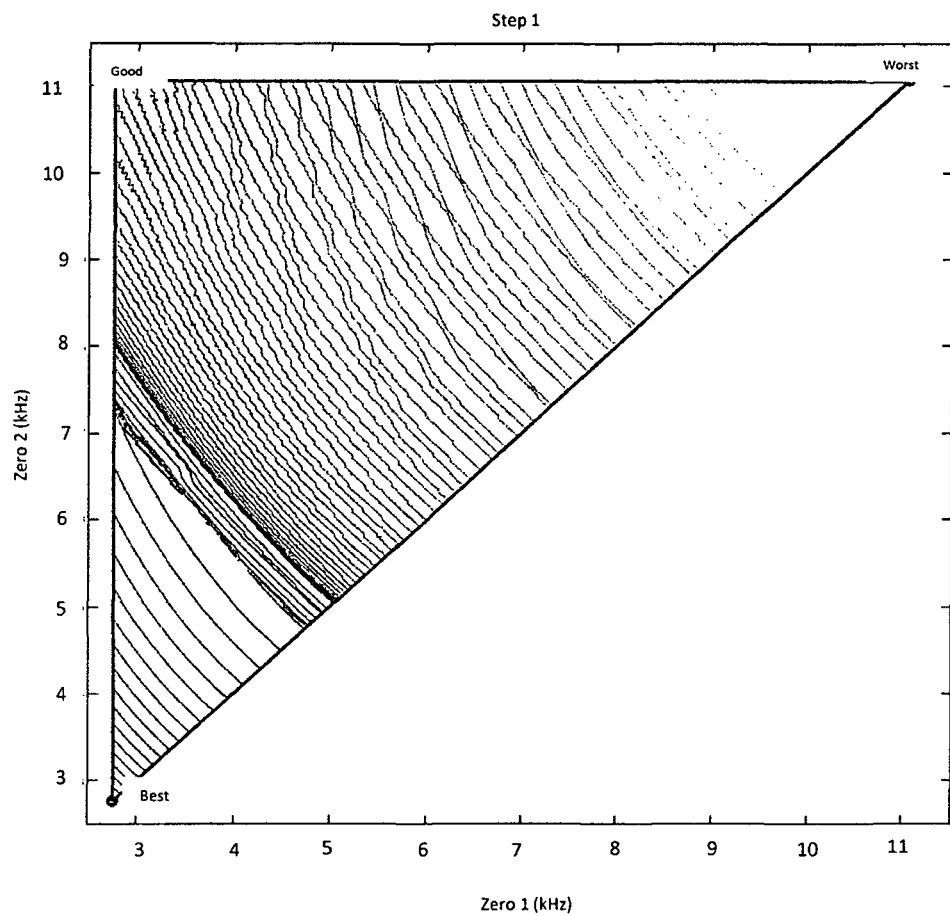
Figure 8B:
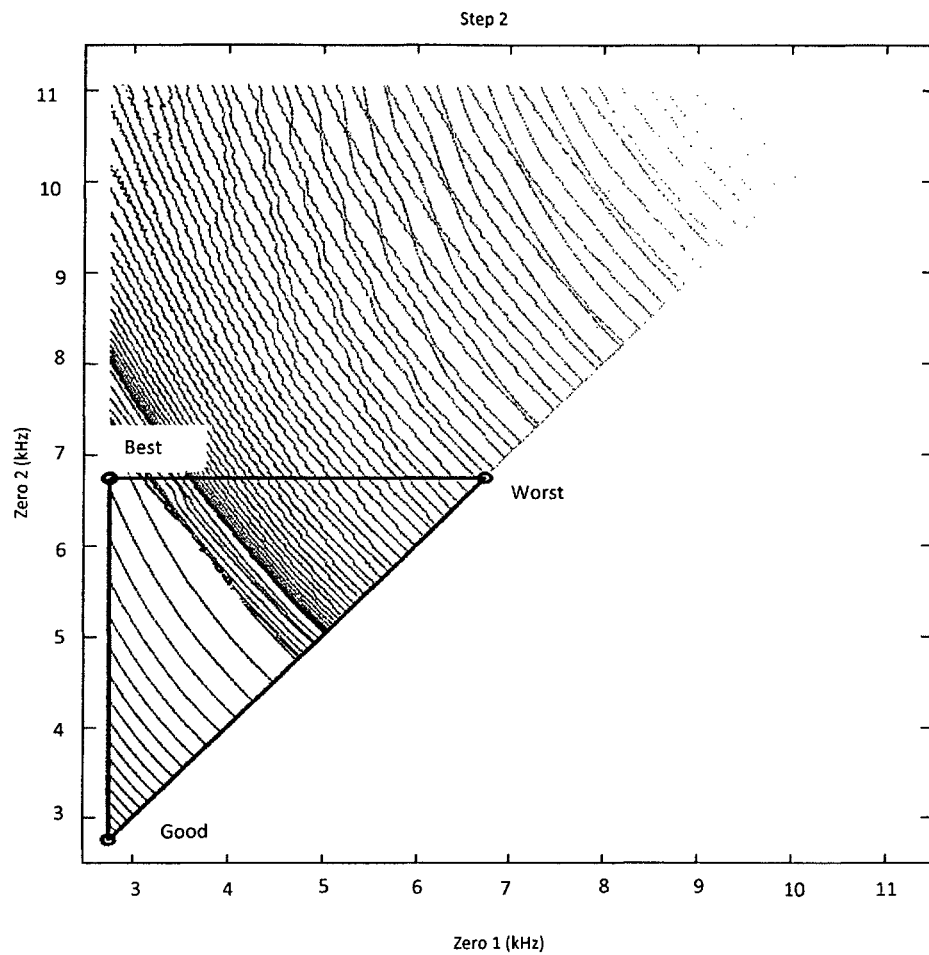
Figure 8C:
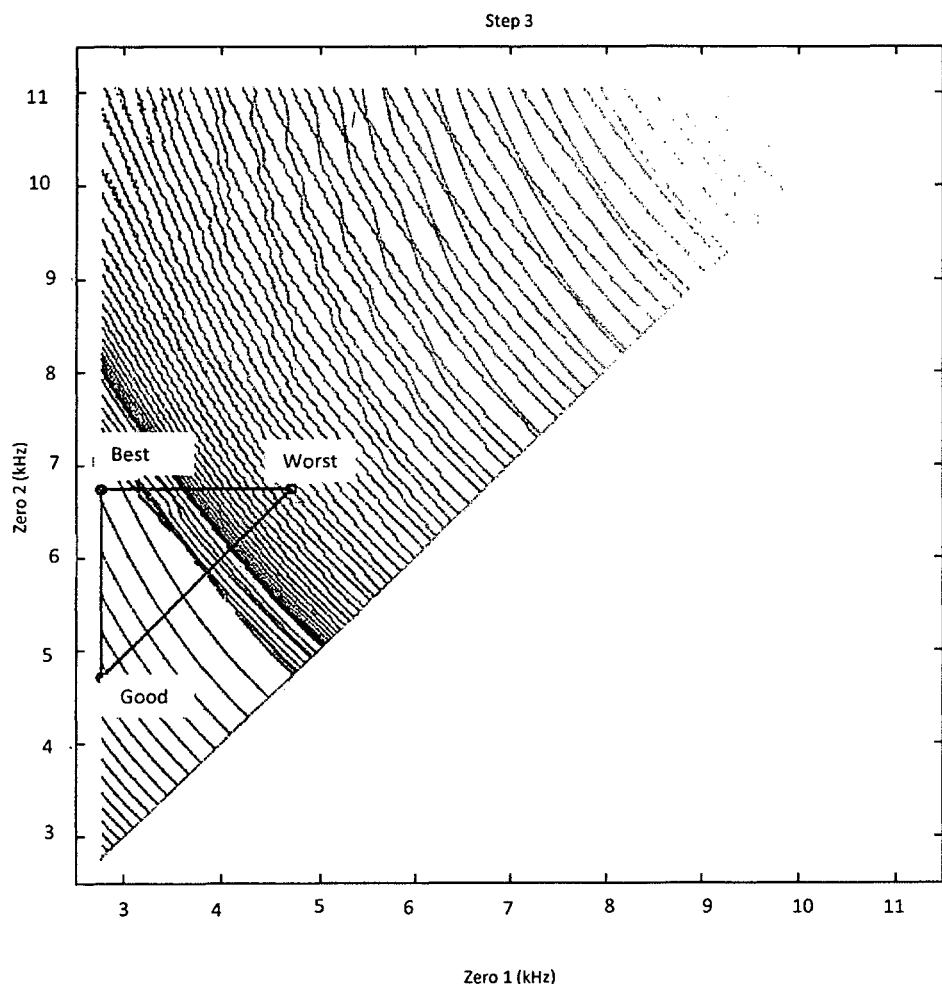

FIGS. 8A to 8C show experimental results that are helpful for understanding the process illustrated in FIG. 7. In these experiments, a huge number of simulations of the SMPS's response to load transients have been performed in order to be able to calculate the goal function as a detailed surface over the search space, which took 30-48 hours using a high-performance computer. FIGS. 8A to 8C show two-dimensional "equal value" equidistant projections of the goal function onto the search space. In this example, the goal function takes the form indicated in the above-described first embodiment, with N=1. In FIG. 8A, the first triangle is shown, and its corners are labelled "Best", "Good", and "Worst", these being ranked in terms of the corresponding goal function values (i.e. with the corner labelled "Best" yielding the lowest value of the goal function, and the corner labelled "Worst" yielding the largest). This triangle corresponds to the search area mention above.

The result of performing the first iteration of steps S440 and S450 is shown in FIG. 8B. The middle point between the "Best" and "Good" corners becomes the new "Best" corner, the former "Best" corner becomes the "Good" corner, and the "Worst" corner is replaced with a better but still "Worst" corner.

The result after the next iteration is shown in FIG. 8C. The middle point between the "Best" and "Good" corners after the first iteration becomes the new "Good" corner, and the "Best" corner remains the same. The third corner becomes the new "Worst" corner.

Embodiment 2

In the first embodiment described above, the goal function G is evaluated to provide a measure of the size or the recovery time of the output voltage deviation that occurs in response to a change in the load current of the SMPS 100. However, the exemplary kinds of goal function identified above may not provide an indication of whether particular candidate values for natural frequencies of the zeros will lead to an output voltage deviation that satisfies certain user requirements. For example, a goal function of the form:

$$[\int_0^{T_{trans}} |V_{out}(t) - V_{DC}|^N dt]^{1/N},$$

with N=1, may indicate that the time integral of the output voltage deviation is small, while the voltage $V_{out}(t)$ may have a peak amplitude that is unacceptably high for the application at hand. Under these circumstances, the above goal function would provide no indication of the peak voltage deviation, and may ultimately lead to the setting of inappropriate control law parameters. This and other forms of goal function could therefore allow the algorithm for estimating the natural frequencies of the zeros to converge on a solution in the search space that yields unacceptable performance.

To improve the performance of the above-described search algorithm in this respect, the present inventors have devised a modification that makes use of a second goal function, G2, which provides a measure of how much the determined (e.g. simulated or measured) deviation of the output voltage exceeds a prescribed deviation of the output voltage, which may be regarded as the "worst case" deviation that the user is willing to accept. In other words, the prescribed output voltage deviation may be a user-specified requirement which defines the largest voltage deviation that can be tolerated. As will be explained in the following, the second goal function G2 can be used to focus the search in the search space to an area of the search space containing solutions that satisfy the user's requirement, thus allowing improved control loop performance to be achieved.

The apparatus of the present embodiment is the same as that of the first embodiment in many respects, and the description of like components (and the above-mentioned modifications and variations to the first embodiment that are also applicable to the second embodiment) will therefore not be repeated here. However, the differences between the first and second embodiments will now be described with reference to FIGS. 10 to 13. In these figures, like components are identified with like reference signs.

Figure 10:
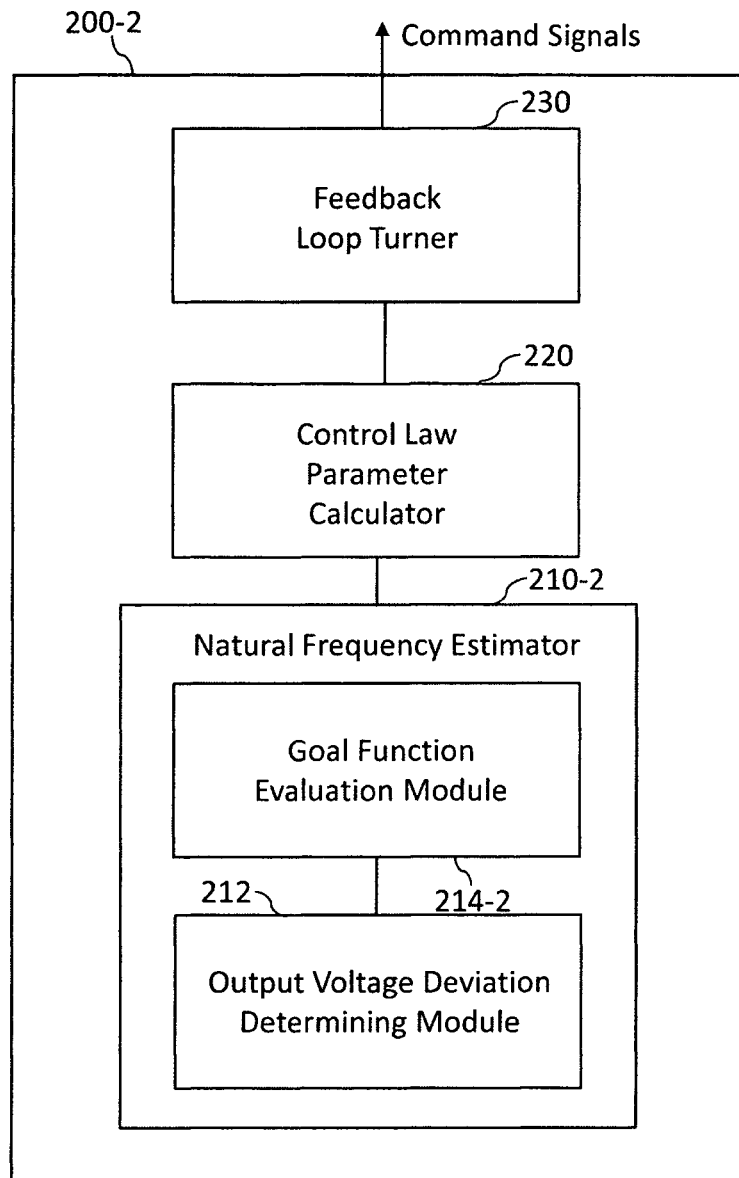
FIG. 10 illustrates functional components of a feedback loop tuning apparatus according to a second embodiment of the present invention.

FIG. 10 shows function components of the apparatus 200-2 of the second embodiment. The apparatus 200-2 comprises a natural frequency estimator 210-2 having an output voltage deviation determining module 212 and a goal function evaluation module 214-2, as well as a control law parameter calculator 220 and (optionally) a feedback loop tuner 230, which are functionally inter-connected as shown. While the output voltage deviation determining module 212, the control law parameter calculator 220 and the feedback loop tuner 230 are the same as in the first embodiment, the natural frequency estimator 210-2 and the goal function evaluation module 214-2 are different, as will be explained in the following. It should be noted that the feedback loop tuning apparatus 200-2 of the present embodiment may also be implemented in programmable signal processing hardware of the kind described above with reference to FIG. 3.

At a top level, the feedback loop tuning apparatus 200-2 of the present embodiment tunes the feedback loop of the SMPS similarly to the first embodiment, as described above with reference to FIG. 4. However, the goal function evaluation module 214-2 of the present embodiment performs, in a variation of step S100 in FIG. 4, an additional process of evaluating the second goal function, G2, using the prescribed deviation of the output voltage $V_r$ of the SMPS and the determined deviation of the output voltage $V_{out}$ of the SMPS at each of the plurality of points in the search space to obtain a measure of how much the determined deviation of the output voltage exceeds the prescribed deviation of the output voltage in response to the variation in the load current of the SMPS. The natural frequency estimator 210-2 then estimates the location of the minimum of the (first) goal function G based not only on the evaluated values of the goal function G but also the evaluated values of the second goal function G2.

Figure 11A:
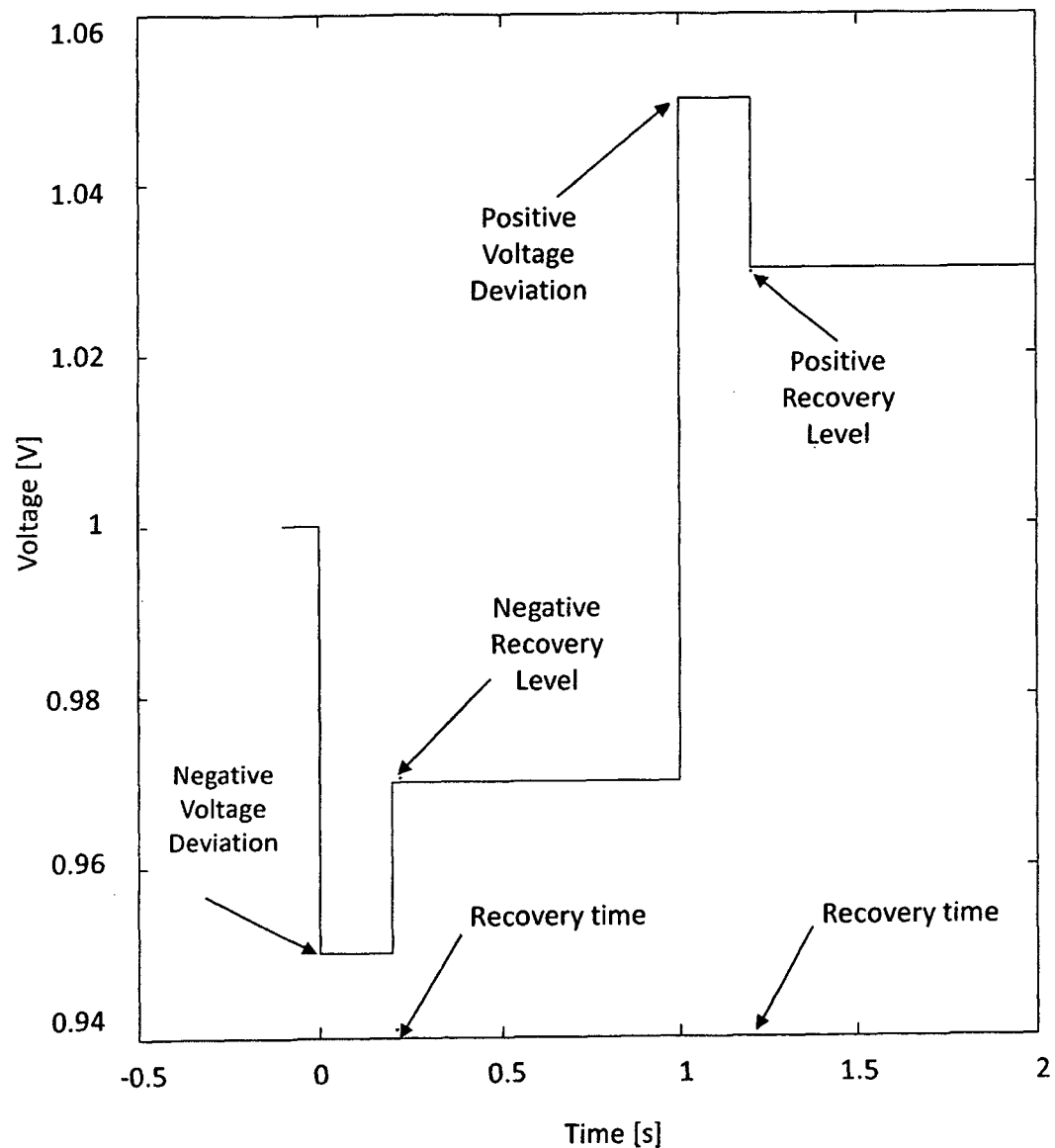
FIG. 11A shows an example of a prescribed output voltage deviation, $v_r(t)$, to be used for evaluating a second goal function, G2, in the second embodiment.

The prescribed deviation of the output voltage of the SMPS may be a time-invariant output voltage deviation which should not be exceeded during operation of the SMPS feedback control loop, e.g. $\pm V_{max}$ Volts, where $V_{max}$ represents the size of the maximum desired voltage deviation. Alternatively, the prescribed output voltage deviation may be specified in terms of a voltage range, e.g. $[-V_{max1}, V_{max2}]$, where $V_{max1}$ and $V_{max2}$ are positive real numbers. However, it may be preferable, as in the present embodiment, for the prescribed deviation of the output voltage to follow a prescribed variation over time. For example, the prescribed output voltage deviation may be specified in terms of a negative maximum voltage deviation, a first recovery time, a negative recovery level, a positive maximum voltage deviation, a second recovery time and a positive recovery level, as illustrated in FIG. 11A. As shown in FIG. 11A, the prescribed output voltage deviation follows a step-like variation with time. In general, the negative maximum voltage deviation and the negative recovery level need not be the same in size as the positive maximum voltage deviation and the positive recovery level, and the first and second recovery times may differ. However, in the example of FIG. 11A, the positive and negative maximum voltage deviations, and the positive and negative recovery levels, are equal in magnitude, and the first and second recovery times are the same.

Of course, it will be appreciated that the time variation of the prescribed output voltage deviation shown in FIG. 11A is only an example, and that the prescribed output voltage deviation may take one of many other different forms, which may be specified by the user in accordance with their requirements. In general, the prescribed time-dependent output voltage deviation is specified by any suitable requirement function, $v_r(t)$.

Figure 11B:
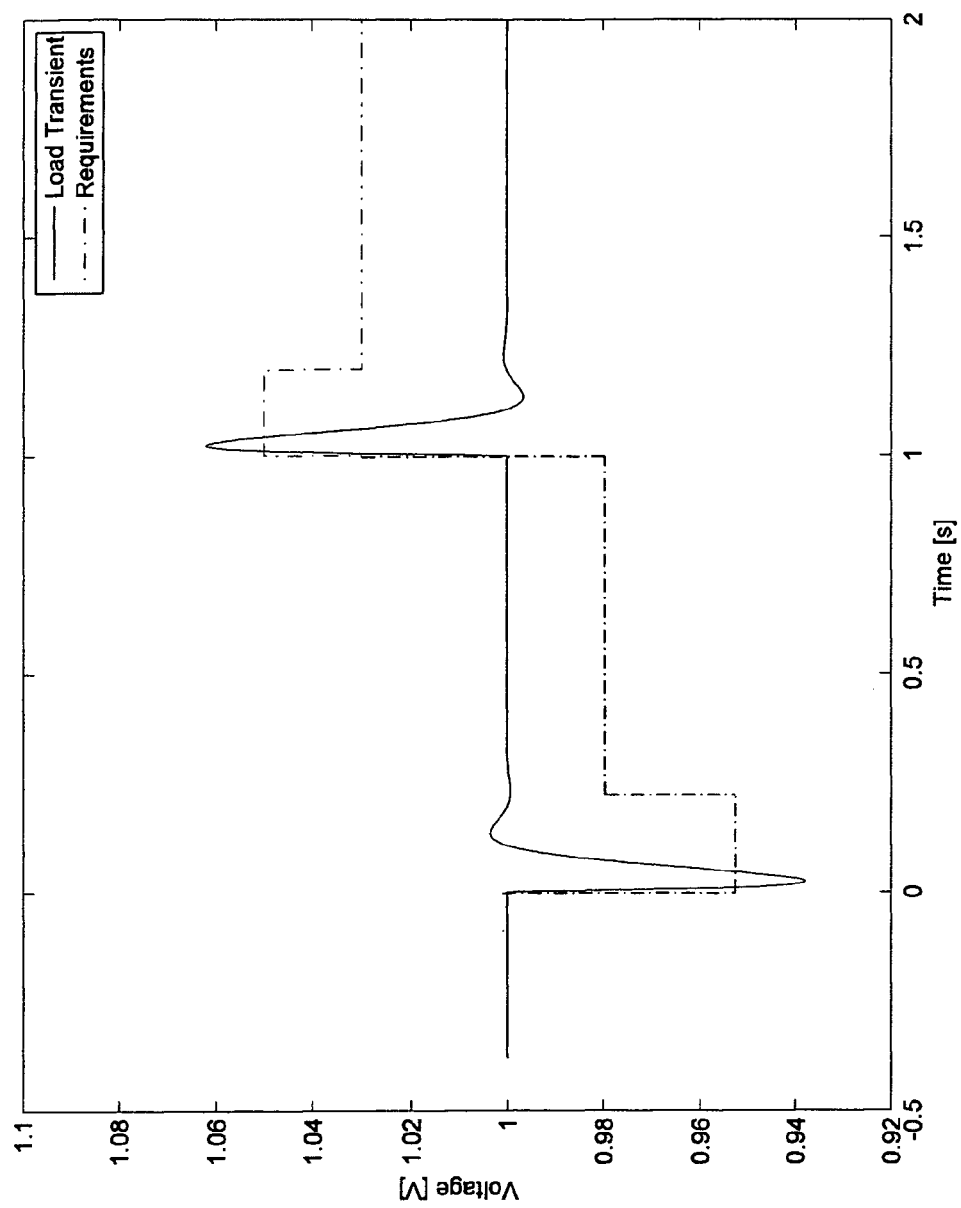
FIGS. 11B to 11F illustrate how the second goal function G2 may be evaluated in the second embodiment.
Figure 11C:
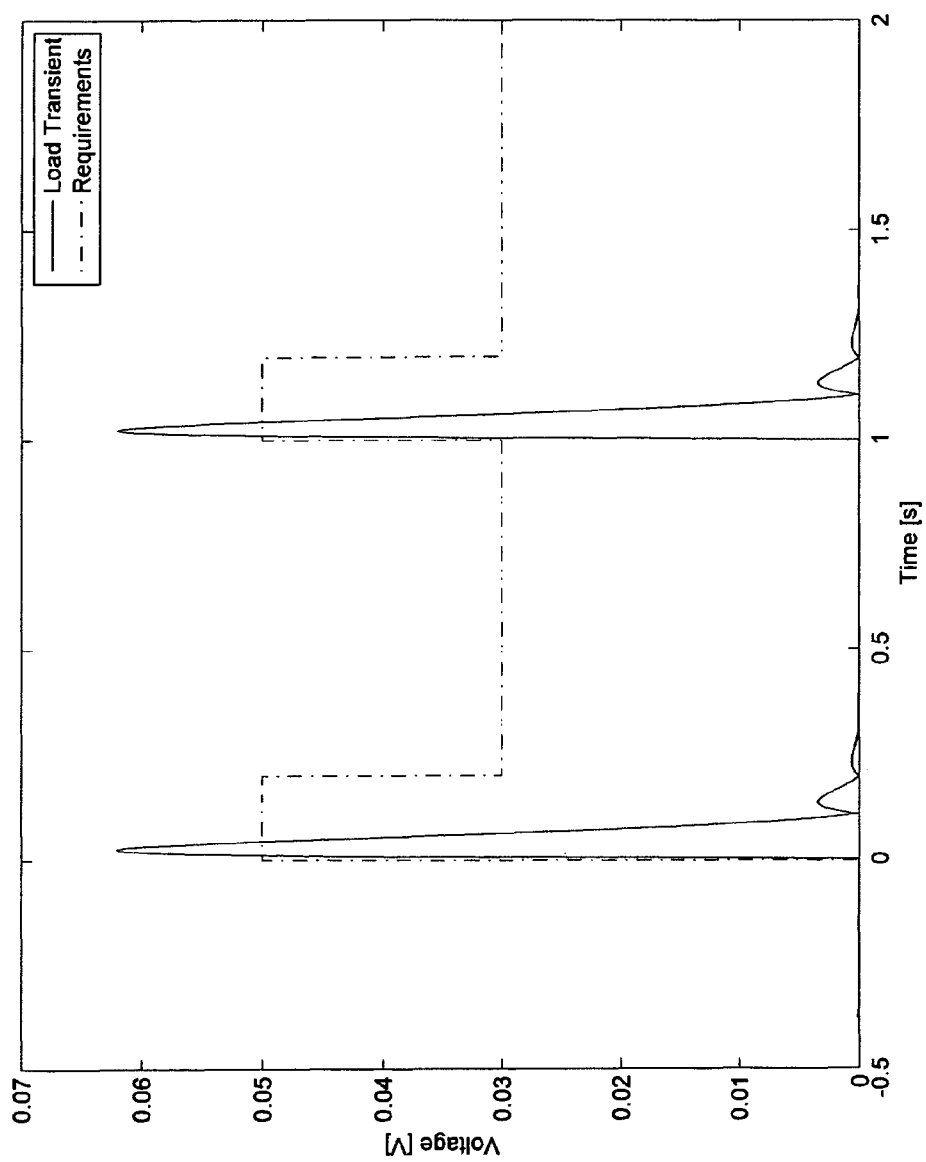
Figure 11D:
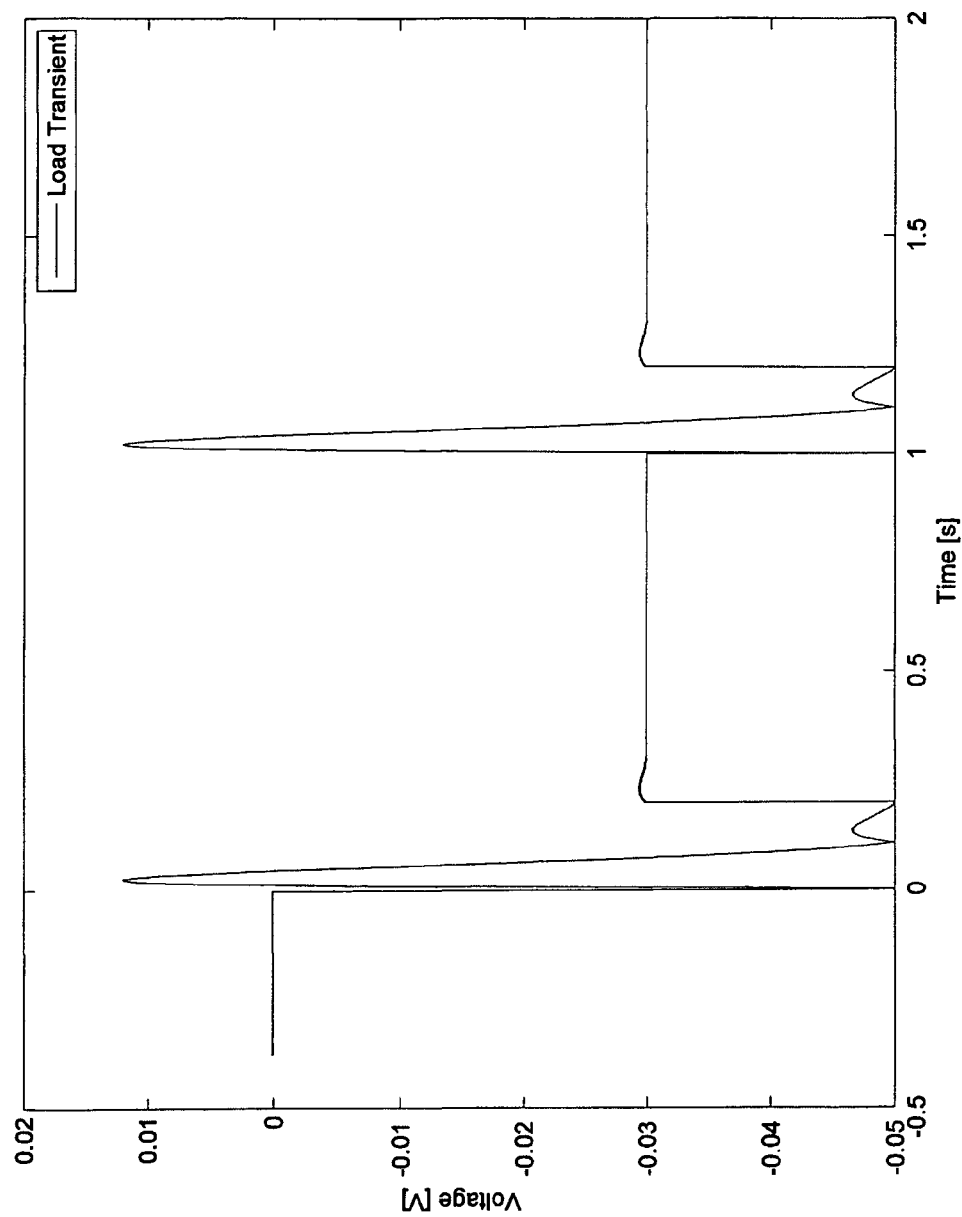
Figure 11E:
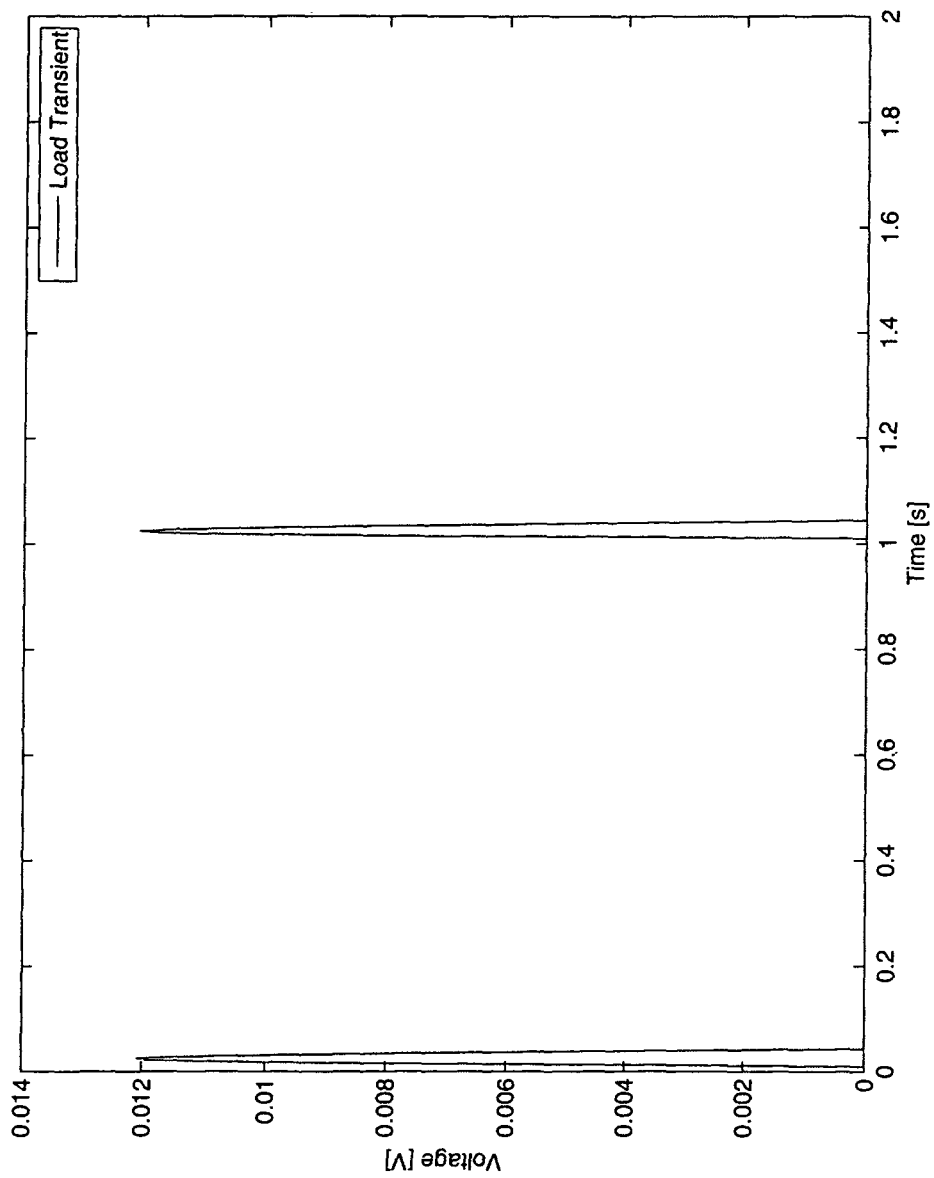
Figure 11F:
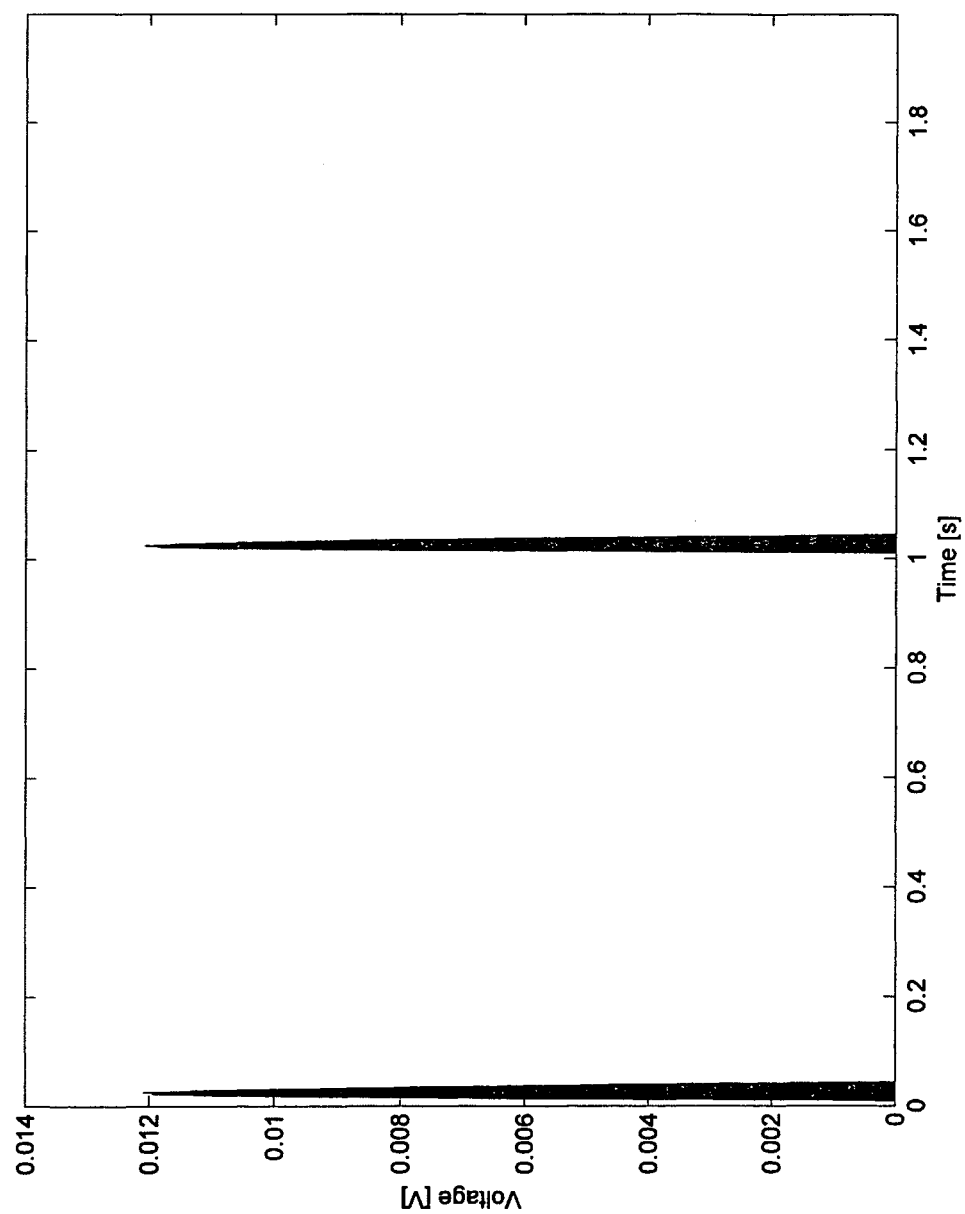

The evaluation of the second goal function G2 in the present example will now be described with reference to FIGS. 11B to 11F. FIG. 11B shows plots of the simulated output voltage deviation, $V_{out}(t)$ (solid line), and the prescribed output voltage deviation matching user requirements, $V_r(t)$ (dashed line). The evaluation begins with the removal of the DC level from each of the traces shown in FIG. 11B, and taking the modulus of the resulting signals. Then, the modulus of the DC-level adjusted requirement function $v_r(t)$ is subtracted from the modulus of the DC-level adjusted voltage $V_{out}(t)$, leading to the result shown in FIG. 11D. Next, only the positive parts of the trace in FIG. 11D are kept, resulting in a trace as shown in FIG. 11E. Finally, the trace shown in FIG. 11E is integrated, as illustrated by the shaded areas in FIG. 11F. In this example, the second goal function G2 is thus evaluated to give a value of $5.18 \cdot 10^{-4}$ Vs.

It will be appreciated from the foregoing that the second goal function of this example may be expressed as follows:

$$G2 = \int_0^{T_{trans}} dt \left\{ \begin{array}{ll} |V_{out}(t) - V_{DC}| - |V_r(t) - V_{DC}|, & |V_{out}(t) - V_{DC}| - |V_r(t) - V_{DC}| > 0 \\ 0, & |V_{out}(t) - V_{DC}| - |V_r(t) - V_{DC}| \le 0 \end{array} \right\}$$

By evaluating a second goal function of the kind described above, the natural frequency estimator 210-2 is able to estimate the natural frequencies of the zeros whilst taking into account whether candidate values of the natural frequencies, which are considered during the estimation of the goal function minimum, fulfil requirements set by the user, i.e. whether the candidate values lead to output voltage deviations that do not exceed the prescribed output voltage deviation. In this way, candidate natural frequencies that lead to satisfactory voltage transients can be selected in preference to candidate natural frequencies that do not, thereby avoiding the need for the user to examine the suitability of the resulting control law parameters for the application at hand.

The procedure by which the natural frequency estimator 210-2 determines estimates of the natural frequency of each of two zeros in the transfer function of the feedback loop in the present embodiment will now be described with reference to FIG. 12.

Figure 12:
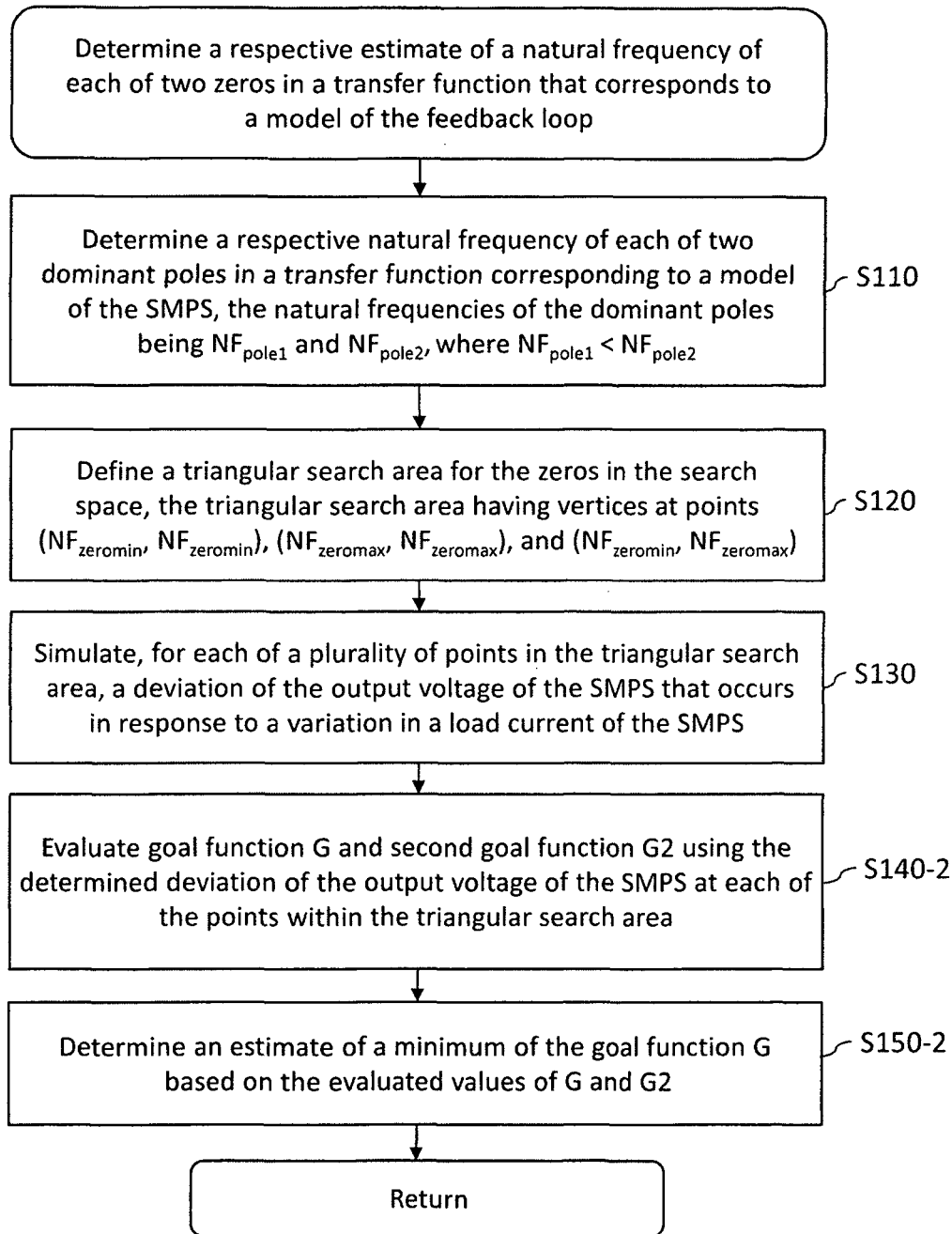
FIG. 12 is a flow diagram illustrating a method of tuning the feedback loop of a SMPS in the second embodiment.

As can be appreciated from FIG. 12, the natural frequency estimation process of the present embodiment employs some processes that are the same as those in FIG. 5, and the details of the common processes (which are labelled with like reference signs) will not be repeated here. The process of FIG. 12 differs from that in FIG. 5 by steps S140-2 and S150-2, as will now be explained.

In step S140-2, the goal function evaluation module 214-2 evaluates not only one of the above-described kinds of first goal function G using the determined deviation of $V_{out}$ at each of the plurality of points within the triangular search area (as in the first embodiment) but also the second goal function, G2, using a prescribed deviation of the output voltage of the SMPS, $V_r(t)$, and the determined deviation of the output voltage of the SMPS, $V_{out}(t)$, at each of the plurality of points in the search space. In step S150-2, the natural frequency estimator 210-2 estimates the location of the minimum of the first goal function G based on the evaluated values of the first goal function G and the evaluated values of the second goal function G2.

As in the case of the first embodiment, although steps S130 and S140-2 in FIG. 12 may be performed sequentially on a set of points in the search area (which may, for example, be arranged in a grid) which defines all of the candidate values of the zeros' natural frequencies to be considered in the estimation of the goal function minimum, steps S130 and S140-2 are preferably performed sequentially on one point at time during an iterative search process, wherein a new candidate point that provides a better estimate of the goal function minimum while satisfying the user requirement is generated in each iteration of the search process.

An example of such a search process which has been devised by the present inventors, and which provides a particularly efficient implementation of steps S130, S140-2 and S150-2, will now be described with reference to FIGS. 13A and 13B.

In step S505, the natural frequency estimator 210-2 calculates the deviation of $V_{out}$ and an associated value of the second goal function G2 for each of the vertices of the triangular search area.

In step S510, the natural frequency estimator 210-2 replaces the vertex of the triangular search area yielding the greatest value of G2 with a vertex within the search area that yields a smaller value of G2 to generate a triangle within the search area that is defined by the vertex within the search area and the remaining vertices of the triangular search area.

In step S512, the natural frequency estimator 210-2 sets the value of a program loop counter $j_2$ to an initial value of 1.

In step S515, the natural frequency estimator 210-2 calculates the deviation of $V_{out}$ for the new vertex and evaluates G2 for the new vertex.

In step S520, the natural frequency estimator 210-2 determines whether G2 has been evaluated to be zero at the new vertex in step S515 and has been evaluated to be zero at the remaining vertices of the triangle generated in step S510 (or step S525 as detailed below). If G2 has been evaluated to be zero at the new vertex in step S515 and has been evaluated to be zero at the remaining vertices of the triangle generated in step S510 (or in step S525, as the case may be), then the process proceeds to step S522, wherein the natural frequency estimator 210-2 sets the value of the program loop counter $j_2$ to a value of 0, and the process proceeds to A in FIG. 13B. On the other hand, if it has been determined that G2 is not zero at the new vertex and at the remaining vertices of the triangle generated in step S510, then the process proceeds to step S525, wherein the natural frequency estimator 210-2 replaces the vertex of the triangle yielding the greatest value of G2 with a new vertex within the search area that yields a smaller value of G2 to generate a new triangle within the search area.

In step S527, the natural frequency estimator 210-2 updates the value of the loop counter $j_2$ by incrementing it by 1, and determines whether the updated value of the loop counter $j_2$ is equal to a threshold value $J_2$. If the loop counter $j_2$ reaches the threshold value of $J_2$, the process proceeds to step S528, wherein the natural frequency estimator 210-2 generates an indication that it has not been possible to find natural frequencies that yield an output voltage deviation satisfying the user requirements using the predefined number of iterations, $J_2$. This indication may, as in the present embodiment, be provided to the user in the form of an error message. On the other hand, if the loop counter $j_2$ has not yet reached $J_2$, then the process loops back to step S515, as shown in FIG. 13A.

In this way, steps S515 and S525 may be repeated to generate a series of triangles within the search area until G2 is evaluated to be zero at all three vertices of the final triangle generated in the search area, the final triangle defining a restricted search area which is likely to contain a minimum value of the goal function G that complies with the user requirement.

The search process performed by the natural frequency estimator 210-2 in the restricted search area will now be described with reference to FIG. 13B.

In step S530, the natural frequency estimator 210-2 calculates the deviation of $V_{out}$ and an associated value of the goal function G for each of the vertices of the restricted triangular search area.

In step S535, the natural frequency estimator 210-2 replaces the vertex of the restricted triangular search area yielding the greatest value of G with a vertex within the restricted search area that yields a smaller value of G to generate a triangle within the restricted search area that is defined by the new vertex and the remaining vertices of the restricted search area.

In step S540, the natural frequency estimator 210-2 sets the value of a program loop counter j to an initial value of 1.

In step S545, the natural frequency estimator 210-2 calculates the deviation of $V_{out}$ for the new vertex and the goal function evaluation module 214 evaluates the goal function G and, preferably, also the second goal function G2 for the new vertex.

Where G2 has been evaluated in step S545, the natural frequency estimator 210-2 determines in step S550 whether G2 is greater than zero. If G2>0, then the process loops back to step S525 in FIG. 13A, otherwise the process continues to step S555 in FIG. 13B. In this way, the natural frequency estimator 210-2 may perform a check to ensure that the search in the restricted search area does not lead to solutions that do not comply with user requirements.

In step S555, the natural frequency estimator 210-2 replaces the vertex of the triangle yielding the greatest value of G with a new vertex within the restricted search area that yields a smaller value of G to generate a new triangle within the restricted search area.

In step S560, the natural frequency estimator 210-2 updates the value of the loop counter j by incrementing it by 1, and determines whether the updated value of the loop counter j is equal to a threshold value J. Thus, the stopping criterion for stopping the repeated performance of steps S545, S550 and S555 is that a predetermined number J of loop iterations have been performed. In some practical implementations of this search method, the inventors have found that J=15 to 25 is sufficient. However, it should be noted that other stopping criteria, which may relate to the degree of convergence of the search, may alternatively be used. For example, the algorithm may be modified to break out of the loop defined by steps S545 to S555 when the triangle becomes smaller than a predetermined size, e.g. such that the natural frequencies defined by the coordinates of its vertices differ by less than a predetermined amount, e.g. 10 to 20 Hz.

When the stopping criterion has been met (in this example, when the loop counter j reaches the threshold value of J), the process proceeds to step S565, wherein the natural frequency estimator 210-2 estimates the location of the minimum of the goal function G within the restricted search area based on the evaluated values of G to obtain an estimate of the natural frequencies of the zeros.

For example, the natural frequency estimator 210-2 may select a point in or on the triangle generated in the final performance of step S555, e.g. one of the vertices of the triangle, preferably the vertex giving the lowest value of G. The natural frequency estimator 210-2 may alternatively select a point in or on the triangle generated in the penultimate (or an even earlier) performance of step S555, although less preferably. In each of these cases, the coordinates of the selected point provide the estimate of the natural frequencies of the zeros.

[Modifications and Variations]

Many modifications and variations can be made to the embodiments described above.

For example, the modelling of the power train described above may be replaced by system identification. This may be done by superimposing a disturbance on the normal signal and analysing what happens on the output, for example as described in "System Identification—Theory for the User" by L. Ljung (Prentice-Hall, Englewood Cliffs, ISBN 0-13-881640, 1987). This disturbance can be injected in many different ways. One way is to use relay feedback, as described in "Automatic tuning of PID controllers" by K. J. Åström and T. Hagglund (Instrument Society of America, ISBN 1-55617-081-5, 1988). Alternatively, the disturbance can be injected by causing limit cycles or injecting a noise signal, as described in the doctoral thesis of Zhao Zhenyu, entitled "Design and Practical Implementation of Digital Auto-tuning and Fast-response Controllers for Low-power Switch-mode Power Supplies" (University of Toronto, Canada, 2008).

Furthermore, goal functions different to those described above may be used. For example, as a further alternative, the following goal function may be used as the first goal function G:

$$\left[\frac{V_{Dev}}{V_{Dev\_Req}}\right]^K, \left[\frac{T_D}{T_{D\_Req}}\right]^L,$$

wherein K and L are integers with K≥1 and L≥1.

Figure 9:
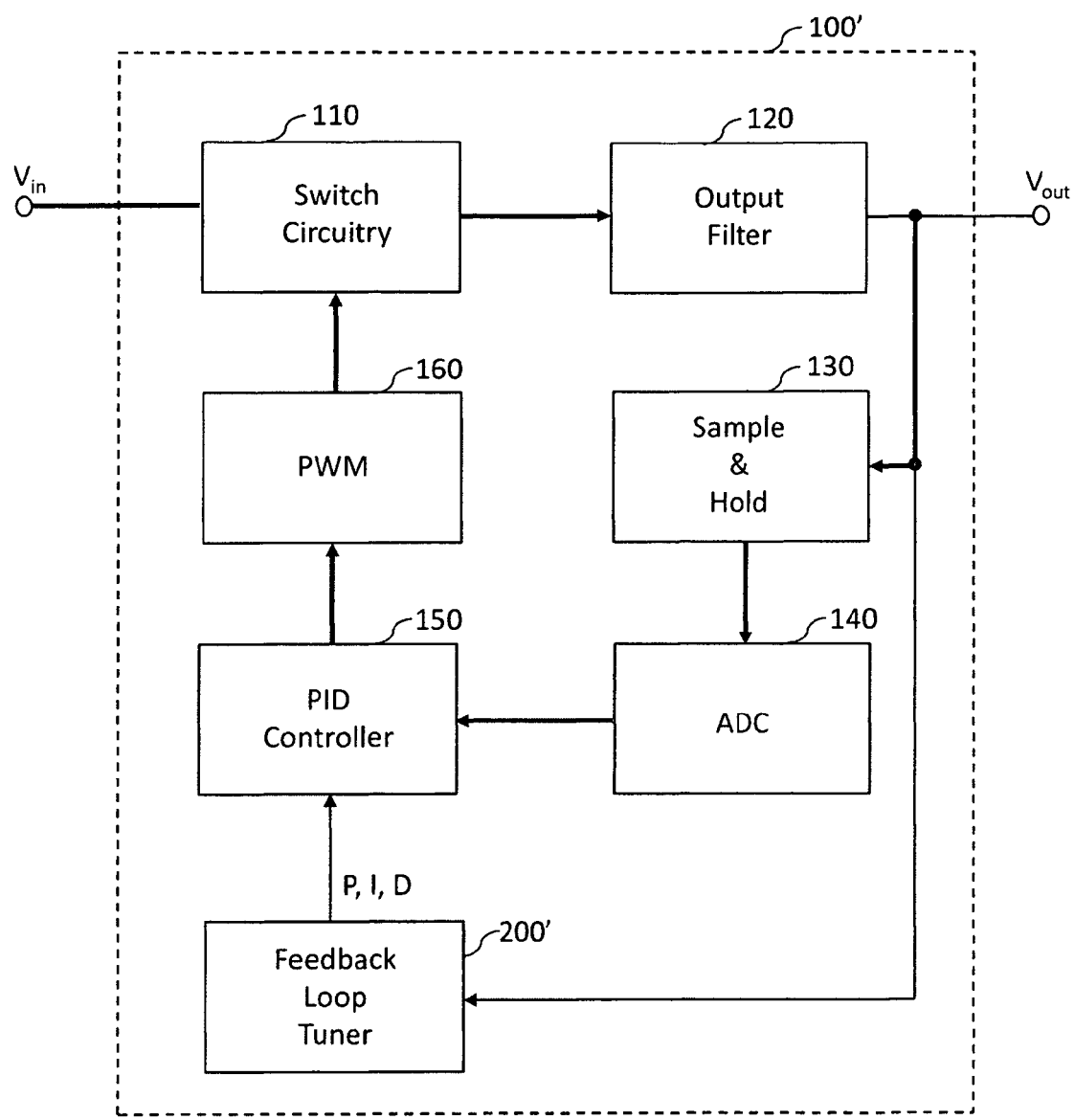
FIG. 9 is a schematic illustration of a SMPS according to an embodiment of the present invention.

Although the feedback loop tuning apparatus of the above-described embodiments is provided in the form of hardware arranged to interface with a SMPS so as to tune values of the control law parameters of the control law governing the output voltage regulation, the feedback loop tuning apparatus and the variants thereof described above may alternatively be incorporated into a SMPS, for example so that it forms part of one or more of the components of the SMPS feedback loop (e.g. the PID controller 150) or another component of the SMPS. A SMPS according to such an embodiment of the present invention is schematically illustrated in FIG. 9, with components that are the same as those in FIG. 1 being labelled with like reference signs. The SMPS 100' of this embodiment comprises an apparatus 200' for tuning the feedback loop that is substantially the same as that described above, differing only in that the output voltage deviation determining module of the apparatus 200' is arranged to determine the deviation of $V_{out}$ by measuring (rather than simulating), for each of the plurality of points within the triangular search area, the deviation of $V_{out}$ that occurs in response to a variation in the load current of the SMPS 100' during operation. In this case, the output voltage deviation determining module may sample $V_{out}$ itself (as illustrated in FIG. 9), or alternatively make use of the sampling performed by the sample and hold circuit 130 and the ADC 140. In either case, the apparatus 200' may function to tune the feedback loop of the SMPS while a series of load transients are applied during the tuning process.

Figure 13A:
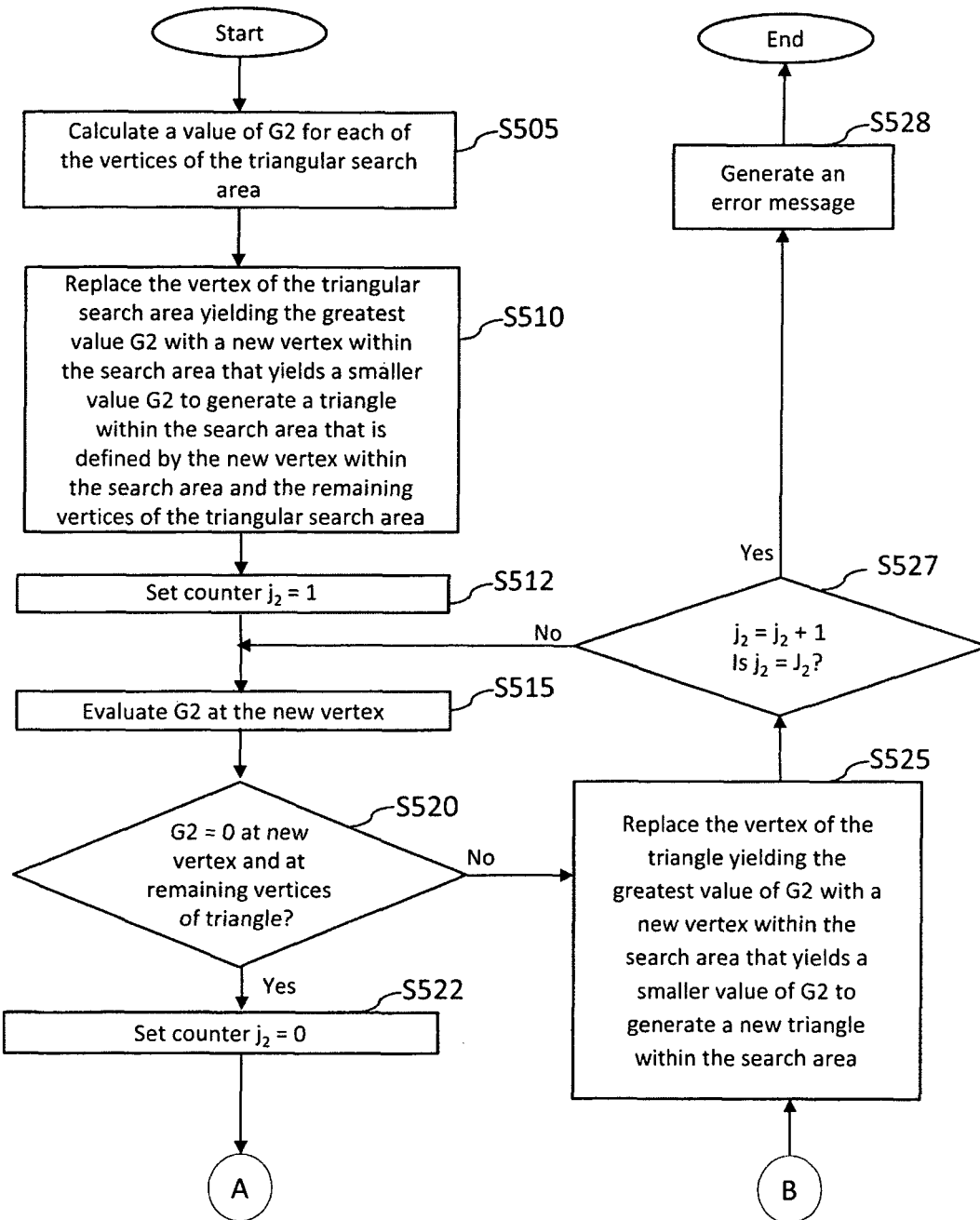
FIGS. 13A and 13B are flow diagrams illustrating a process for estimating the location of a minimum of a goal function used in the tuning of the feedback loop in the second embodiment.
Figure 13B:
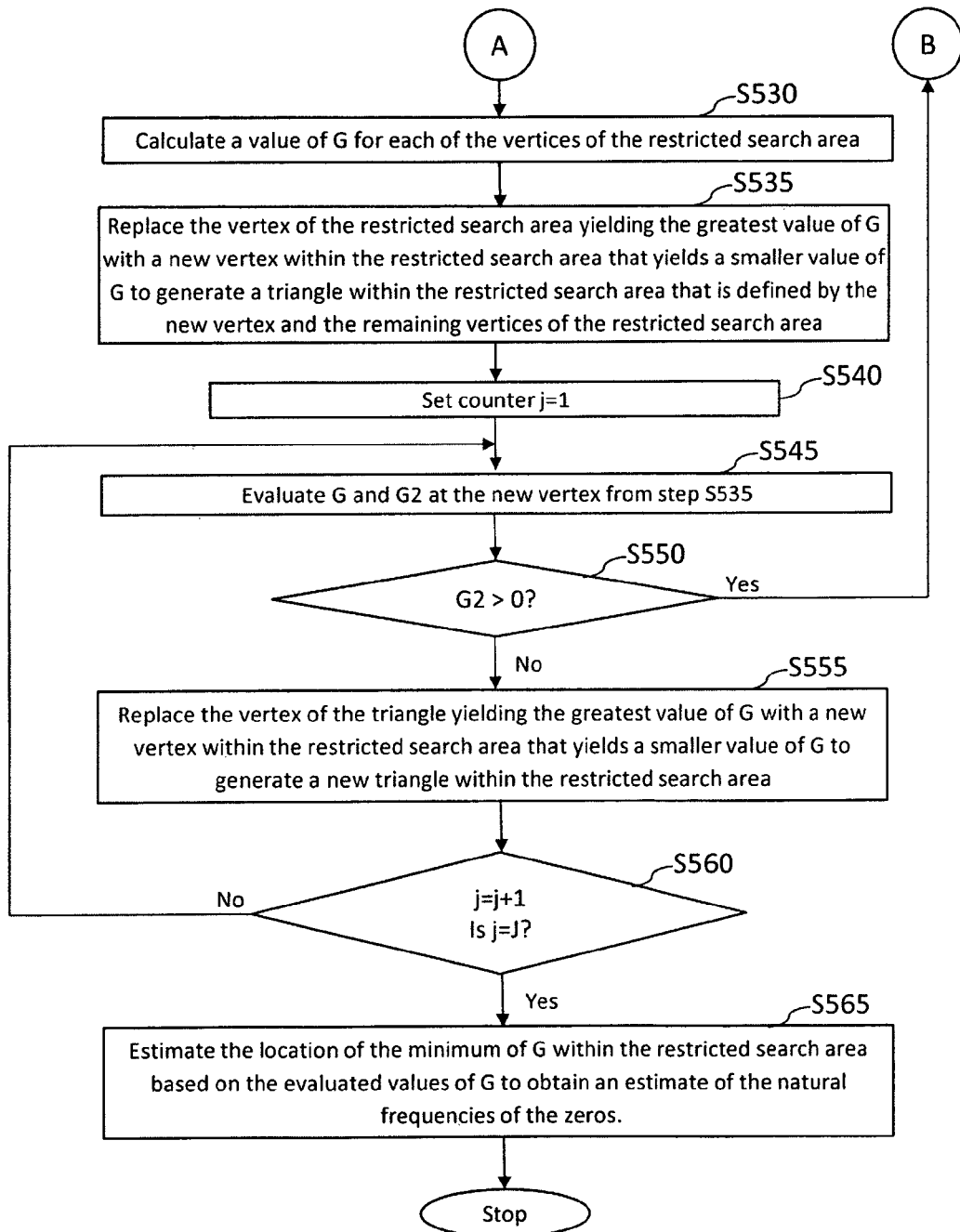

Furthermore, although the process shown in FIGS. 13A and 13B uses a nested loop, the process may alternatively use a single loop, in which evaluated values of G and G2 are used to decide whether a new vertex should be generated in each iteration of the loop.

The invention claimed is:

1. A method of determining values of control law parameters for tuning a feedback loop circuit that is arranged to regulate an output voltage of a switched mode power supply, SMPS, in accordance with a control law defined by the control law parameters, the method comprising:
 determining a respective estimate of a natural frequency of each of two zeros in a transfer function that corresponds to a model of the feedback loop circuit by:
  determining, for each of a plurality of points in a search space, wherein the coordinates of each of the points correspond to candidate values of the natural frequencies of the zeros, a deviation of the output voltage of the SMPS that occurs in response to a variation in a load current of the SMPS;
  evaluating a goal function using the determined deviation of the output voltage of the SMPS at each of the plurality of points to obtain a measure of at least one of a size and a recovery time of the respective output voltage deviation; and
  estimating a location of a minimum of the goal function in the search space based on the evaluated values of the goal function, the location of the minimum of the goal function corresponding to the natural frequencies of the zeros;
 calculating, based on the determined estimates of the natural frequencies of the zeros, the control law parameter values for tuning the feedback loop circuit; and
 tuning the feedback loop circuit in accordance with the calculated control law parameter values.

2. A method according to claim 1, wherein the goal function provides a measure of at least one of a maximum SMPS output voltage deviation during the variation in load current of the SMPS, and a recovery time during which the output voltage of the SMPS returns to within a tolerance band of output voltage values following the variation in the load current of the SMPS.

3. A method according to claim 2, wherein the goal function is given by $$w_{Vdev}\left[\frac{V_{Dev}}{V_{Dev\_Req}}\right]^N + w_R\left[\frac{T_R}{T_{R\_Req}}\right]^M,$$

wherein $V_{dev}$ denotes the maximum SMPS output voltage deviation, $T_R$ denotes the recovery time, $V_{Dev\_Req}$ and $T_{R\_Req}$ are normalization factors, $w_{Vdev}$ and $w_R$ are weighting factors, and N and M are integers with N≥1 and M≥1.

4. A method according to claim 2, wherein the goal function is given by $$\left[\frac{V_{Dev}}{V_{Dev\_Req}}\right]^K\left[\frac{T_R}{T_{R\_Req}}\right]^L,$$

wherein Vdev denotes the maximum SMPS output voltage deviation, $T_R$ denotes the recovery time, $V_{Dev\_Req}$ and $T_{R\_Req}$ are normalization factors, and K and L are integers with K≥1 and L≥1.

5. A method according to claim 2, wherein the goal function is given by $$\left[\int_0^{T_{trans}}|V_{out}(t)-V_{DC}|^N dt\right]^{1/N},$$

wherein Vout(t) denotes the variation in the output voltage of the SMPS that occurs in response to the variation in the load current of the SMPS, $T_{trans}$ denotes the duration of the variation in the load current of the SMPS, $V_{DC}$ denotes a DC voltage from which the output voltage of the SMPS deviates in response to the variation in the load current of the SMPS, and N is an integer greater than or equal to 1.

6. A method according to claim 1, wherein the estimates of the respective natural frequencies of the zeros are determined by:
 determining a respective natural frequency of each of two dominant poles in a transfer function corresponding to a model of the SMPS, the natural frequencies of the dominant poles being $NF_{pole1}$ and $NF_{pole2}$, where $NF_{pole1} \leq NF_{pole2}$;
 defining a triangular search area for the zeros in the search space, the triangular search area having vertices at points ($NF_{zeromin}$, $NF_{zeromin}$), ($NF_{zeromax}$, $NF_{zeromax}$), and one of ($NF_{zeromin}$, $NF_{zeromax}$) and ($NF_{zeromax}$, $NF_{zeromin}$), where $NF_{zeromin}=NF_{pole1}/r_{min}$, $NF_{zeromax}=NF_{pole2} \cdot r_{max}$, and $r_{min}$ and $r_{max}$ are range factors each between 1.5 and 3;
 determining, for each of a plurality of points in the triangular search area, a deviation of the output voltage of the SMPS that occurs in response to the variation in the load current of the SMPS;
 evaluating the goal function using the determined deviation of the output voltage of the SMPS at each of the plurality of points within the triangular search area to obtain the measure of at least one of the size and the recovery time of the respective output voltage deviation; and
 estimating the location of the minimum of the goal function within the triangular search area based on the evaluated values of the goal function.

7. A method according to claim 6, wherein the deviation of the output voltage of the SMPS is determined by simulating, at each of the plurality of points within the triangular search area, the deviation of the output voltage of the SMPS that occurs in response to the variation in the load current of the SMPS, using the model of the SMPS and the model of the feedback loop circuit.

8. A method according to claim 6, wherein the deviation of the output voltage of the SMPS that occurs in response to the variation in the load current of the SMPS is determined by measuring, for each of the plurality of points within the triangular search area, the deviation of the output voltage of the SMPS that occurs in response to a variation in the load current of the SMPS during operation.

9. A method according to claim 6, wherein the natural frequencies of the zeros are estimated by:
(i) calculating a value of the goal function for each of the vertices of the triangular search area;
(ii) replacing the vertex of the triangular search area yielding the greatest value of the goal function with a new vertex within the search area that yields a smaller value of the goal function to generate a triangle within the search area that is defined by the vertex within the search area and the remaining vertices of the triangular search area;
(iii) evaluating the goal function at the new vertex;
(iv) replacing the vertex of the triangle yielding the greatest value of the goal function with a new vertex within the search area that yields a smaller value of the goal function to generate a new triangle within the search area;
(v) repeating steps (iii) and (iv) to generate a series of triangles within the search area until a stopping criterion is met; and
(vi) when the stopping criterion is met, estimating the location of the minimum of the goal function within the search area based on the evaluated values of the goal function to obtain an estimate of the natural frequencies of the zeros.

10. A method according to claim 9, wherein step (vi) comprises selecting a point in or on the triangle generated in the final performance of step (iv), the coordinates of the selected point providing the estimate of the natural frequencies of the zeros.

11. A method according to claim 6, further comprising:
evaluating a second goal function using a prescribed deviation of the output voltage of the SMPS and the determined deviation of the output voltage of the SMPS at each of the plurality of points in the triangular search area to obtain a measure of how much the determined deviation of the output voltage exceeds the prescribed deviation of the output voltage in response to the variation in the load current of the SMPS,
wherein the natural frequencies of the zeros are estimated by:
(i) calculating a value of the second goal function for each of the vertices of the triangular search area;
(ii) replacing the vertex of the triangular search area yielding the greatest value of the second goal function with a new vertex within the search area that yields a smaller value of the second goal function to generate a triangle within the search area that is defined by the new vertex within the search area and the remaining vertices of the triangular search area;
(iii) evaluating the second goal function at the new vertex;
(iv) replacing the vertex of the triangle yielding the greatest value of the second goal function with a new vertex within the search area that yields a smaller value of the second goal function to generate a new triangle within the search area;
(v) repeating steps (iii) and (iv) to generate a series of triangles within the search area until the second goal function is evaluated to be zero at the new vertex in step (iii) and has been evaluated to be zero at the remaining vertices of the triangle generated in the final performance of step (iv), the triangle generated in the final performance of step (iv) defining a restricted triangular search area;
(vi) calculating a value of the goal function for each of the vertices of the restricted search area;
(vii) replacing the vertex of the restricted search area yielding the greatest value of the goal function with a new vertex within the restricted search area that yields a smaller value of the goal function to generate a triangle within the restricted search area that is defined by the new vertex and the remaining vertices of the restricted search area;
(viii) evaluating the goal function at the new vertex from step (vii);
(ix) replacing the vertex of the triangle yielding the greatest value of the goal function with a new vertex within the restricted search area that yields a smaller value of the goal function to generate a new triangle within the restricted search area;
(x) repeating steps (viii) and (ix) to generate a series of triangles within the restricted search area until a stopping criterion is met; and
(xi) when the stopping criterion is met, estimating the location of the minimum of the goal function within the restricted search area based on the evaluated values of the goal function to obtain an estimate of the natural frequencies of the zeros.

12. A method according to claim 11, wherein step (xi) comprises selecting a point in or on the triangle generated in the final performance of step (ix), the coordinates of the selected point providing the estimate of the natural frequencies of the zeros.

13. A method according to claim 11, wherein step (viii) further comprises evaluating the second goal function at the new vertex from step (vii) and, when the second goal function is evaluated to be greater than zero at the new vertex from step (vii), the method comprises repeating steps (iv) to (viii), otherwise continuing to step (ix).

14. A method according to claim 1, wherein determining a respective estimate of the natural frequency of each of two zeros in the transfer function further comprises:
evaluating a second goal function using a prescribed deviation of the output voltage of the SMPS and the determined deviation of the output voltage of the SMPS at each of the plurality of points in the search space to obtain a measure of how much the determined deviation of the output voltage exceeds the prescribed deviation of the output voltage in response to the variation in the load current of the SMPS,
wherein the location of the minimum of the goal function is estimated based on the evaluated values of the goal function and the evaluated values of the second goal function.

15. A method according to claim 14, wherein the prescribed deviation of the output voltage of the SMPS follows a prescribed variation over time.

16. A method according to claim 1, wherein the feedback loop circuit comprises a proportional-integral-derivative (PID) regulator, and the model of the feedback loop circuit models the feedback loop circuit as a PID regulator, the control law parameters comprising the proportional (P), integral (I) and derivative (D) control parameters of the PID regulator.

17. A computer program product stored on a non-transitory computer-readable medium and comprising computer program instructions which, when executed by a processor, cause the processor to:
determine a respective estimate of a natural frequency of each of two zeros in a transfer function that corresponds to a model of the feedback loop circuit by:
determining, for each of a plurality of points in a search space, wherein the coordinates of each of the points correspond to candidate values of the natural frequencies of the zeros, a deviation of the output voltage of the SMPS that occurs in response to a variation in a load current of the SMPS;

evaluating a goal function using the determined deviation of the output voltage of the SMPS at each of the plurality of points to obtain a measure of at least one of a size and a recovery time of the respective output voltage deviation; and estimating a location of a minimum of the goal function in the search space based on the evaluated values of the goal function, the location of the minimum of the goal function corresponding to the natural frequencies of the zeros;

calculate, based on the determined estimates of the natural frequencies of the zeros, the control law parameter values for tuning the feedback loop circuit; and tune the feedback loop circuit in accordance with the calculated control law parameter values.

18. An apparatus arranged to determine values of control law parameters for tuning a feedback loop that is arranged to regulate an output voltage of a switched mode power supply, SMPS, in accordance with a control law defined by the control law parameters, the apparatus comprising:

a natural frequency estimator circuit configured to determine a respective estimate of a natural frequency of each of two zeros in a transfer function that corresponds to a model of the feedback loop, the natural frequency estimator circuit comprising:

an output voltage deviation determining circuit configured to determine, for each of a plurality of points in a search space, wherein the coordinates of each of the points correspond to candidate values of the natural frequencies of the zeros, a deviation of the output voltage of the SMPS that occurs in response to a variation in a load current of the SMPS; and a goal function evaluation circuit configured to evaluate a goal function using the determined deviation of the output voltage of the SMPS at each of the plurality of points to obtain a measure of at least one of a size and a recovery time of the respective output voltage deviation, wherein the natural frequency estimator circuit is configured to estimate a location of a minimum of the goal function in the search space based on the evaluated values of the goal function, the location of the minimum of the goal function corresponding to the natural frequencies of the zeros; and a control law parameter calculator circuit configured to calculate, based on the determined estimates of the natural frequencies of the zeros, the control law parameter values for tuning the feedback loop.

19. An apparatus according to claim 18, further comprising a feedback loop tuner circuit configured to tune the feedback loop in accordance with the calculated control law parameter values.

20. An apparatus according to claim 18, wherein the goal function provides a measure of at least one of a maximum SMPS output voltage deviation during the variation in load current of the SMPS, and a recovery time during which the output voltage of the SMPS returns to within a tolerance band of output voltage values following the variation in the load current of the SMPS.

21. An apparatus according to claim 20, wherein the goal function is given by $$w_{Vdev}\left[\frac{V_{Dev}}{V_{Dev\_Req}}\right]^N + w_R\left[\frac{T_R}{T_{R\_Req}}\right]^M,$$

wherein $V_{dev}$ denotes the maximum SMPS output voltage deviation, $T_R$ denotes the recovery time, $V_{Dev\_Req}$ and $T_{R\_Req}$ are normalization factors, $w_{Vdev}$ and $w_R$ are weighting factors, and N and M are integers with N≥1 and M≥1.

22. An apparatus according to claim 20, wherein the goal function is given by $$\left[\frac{V_{Dev}}{V_{Dev\_Req}}\right]^K\left[\frac{T_R}{T_{R\_Req}}\right]^L,$$

wherein $V_{dev}$ denotes the maximum SMPS output voltage deviation, $T_R$ denotes the recovery time, $V_{Dev\_Req}$ and $T_{R\_Req}$ are normalization factors, and K and L are integers with K≥1 and L≥1.

23. An apparatus according to claim 20, wherein the goal function is given by $$\left[\int_0^{T_{trans}} |V_{out}(t) - V_{DC}|^N dt\right]^{1/N},$$

wherein $V_{out}(t)$ denotes the variation in the output voltage of the SMPS that occurs in response to the variation in the load current of the SMPS, $T_{trans}$ denotes the duration of the variation in the load current of the SMPS, $V_{DC}$ denotes a DC voltage from which the output voltage of the SMPS deviates in response to the variation in the load current of the SMPS, and N is an integer greater than or equal to 1.

24. An apparatus according to claim 18, wherein:

the natural frequency estimator circuit is further configured to:

determine a respective natural frequency of each of two dominant poles in a transfer function corresponding to a model of the SMPS, the natural frequencies of the dominant poles being $NF_{pole1}$ and $NF_{pole2}$, where $NF_{pole1} \leq NF_{pole2}$; and define a triangular search area for the zeros in the search space, the triangular search area having vertices at points ($NF_{zeromin}$, $NF_{zeromin}$), ($NF_{zeromax}$, $NF_{zeromax}$), and one of ($NF_{zeromin}$, $NF_{zeromax}$) and ($NF_{zeromax}$, $NF_{zeromin}$), where $NF_{zeromin} = NF_{pole1}/r_{min}$, $NF_{zeromax} = NF_{pole2} \cdot r_{max}$, and $r_{min}$ and $r_{max}$ are range factors each between 1.5 and 3;

the output voltage deviation determining circuit is configured to determine, for each of a plurality of points in the triangular search area, a deviation of the output voltage of the SMPS that occurs in response to the variation in the load current of the SMPS;

the goal function evaluation circuit is configured to evaluate the goal function using the determined deviation of the output voltage of the SMPS at each of the plurality of points within the triangular search area to obtain the measure of at least one of the size and the recovery time of the respective output voltage deviation; and the natural frequency estimator circuit is configured to estimate a location of the minimum of the goal function in the triangular search area based on the evaluated values of the goal function.

25. An apparatus according to claim 24, wherein the output voltage deviation determining circuit is configured to determine the deviation of the output voltage of the SMPS by simulating, at each of the plurality of points within the triangular search area, the deviation of the output voltage of the SMPS that occurs in response to the variation in the load current of the SMPS, using the model of the SMPS and the model of the feedback loop.

26. An apparatus according to claim 24, wherein the output voltage deviation determining circuit is configured to determine the deviation of the output voltage of the SMPS by measuring, for each of the plurality of points within the triangular search area, the deviation of the output voltage of the SMPS that occurs in response to a variation in the load current of the SMPS during operation.

27. An apparatus according to claim 24, wherein the natural frequency estimator circuit is configured to calculate an estimate of the respective natural frequencies of the zeros by:
  (i) calculating a value of the goal function for each of the vertices of the triangular search area;
  (ii) replacing the vertex of the triangular search area yielding the greatest value of the goal function with a vertex within the search area that yields a smaller value of the goal function to generate a triangle within the search area that is defined by the vertex within the search area and the remaining vertices of the triangular search area;
  (iii) evaluating the goal function at the new vertex;
  (iv) replacing the vertex of the triangle yielding the greatest value of the goal function with a new vertex within the search area that yields a smaller value of the goal function to generate a new triangle within the search area;
  (v) repeating steps (iii) and (iv) to generate a series of triangles within the search area until a stopping criterion is met; and
  (vi) when the stopping criterion is met, estimating the location of the minimum of the goal function in the search area based on the evaluated values of the goal function to obtain an estimate of the natural frequencies of the zeros.

28. An apparatus according to claim 27, wherein the natural frequency estimator circuit is configured to select in step (vi) a point in or on the triangle generated in the final performance of step (iv), the coordinates of the selected point providing the estimate of the natural frequencies of the zeros.

29. An apparatus according to claim 24, wherein:
  the goal function evaluation circuit is further configured to evaluate a second goal function using a prescribed deviation of the output voltage of the SMPS and the determined deviation of the output voltage of the SMPS at each of the plurality of points in the triangular search area to obtain a measure of how much the determined deviation of the output voltage exceeds the prescribed deviation of the output voltage in response to the variation in the load current of the SMPS,
  the natural frequency estimator circuit is configured to calculate an estimate of the respective natural frequencies of the zeros by:
    (i) calculating a value of the second goal function for each of the vertices of the triangular search area;
    (ii) replacing the vertex of the triangular search area yielding the greatest value of the second goal function with a new vertex within the search area that yields a smaller value of the second goal function to generate a triangle within the search area that is defined by the new vertex within the search area and the remaining vertices of the triangular search area;
    (iii) evaluating the second goal function at the new vertex;
    (iv) replacing the vertex of the triangle yielding the greatest value of the second goal function with a new vertex within the search area that yields a smaller value of the second goal function to generate a new triangle within the search area;
    (v) repeating steps (iii) and (iv) to generate a series of triangles within the search area until the second goal function is evaluated to be zero at the new vertex in step (iii) and has been evaluated to be zero at the remaining vertices of the triangle generated in the final performance of step (iv), the triangle generated in the final performance of step (iv) defining a restricted triangular search area;
    (vi) calculating a value of the goal function for each of the vertices of the restricted search area;
    (vii) replacing the vertex of the restricted search area yielding the greatest value of the goal function with a new vertex within the restricted search area that yields a smaller value of the goal function to generate a triangle within the restricted search area that is defined by the new vertex and the remaining vertices of the restricted search area;
    (viii) evaluating the goal function at the new vertex from step (vii);
    (ix) replacing the vertex of the triangle yielding the greatest value of the goal function with a new vertex within the restricted search area that yields a smaller value of the goal function to generate a new triangle within the restricted search area;
    (x) repeating steps (viii) and (ix) to generate a series of triangles within the restricted search area until a stopping criterion is met; and
    (xi) when the stopping criterion is met, estimating the location of the minimum of the goal function within the restricted search area based on the evaluated values of the goal function to obtain an estimate of the natural frequencies of the zeros.

30. An apparatus according to claim 29, wherein the natural frequency estimator circuit is configured to select in step (xi) a point in or on the triangle generated in the final performance of step (ix), the coordinates of the selected point providing the estimate of the natural frequencies of the zeros.

31. An apparatus according to claim 29, wherein the natural frequency estimator circuit is further configured to evaluate in step (viii) the second goal function at the new vertex from step (vii) and, when the second goal function is evaluated to be greater than zero at the new vertex from step (vii), to repeat steps (iv) to (viii), and otherwise to perform steps (ix) to (xi).

32. An apparatus according to claim 18, wherein:
  the goal function evaluation circuit is further configured to evaluate a second goal function using a prescribed deviation of the output voltage of the SMPS and the determined deviation of the output voltage of the SMPS at each of the plurality of points in the search space at which the deviation of the output voltage of the SMPS has been determined, to obtain a measure of how much the determined deviation of the output voltage exceeds the prescribed deviation of the output voltage in response to the variation in the load current of the SMPS; and the natural frequency estimator circuit is configured to estimate the location of the minimum of the goal function in the search space based on the evaluated values of the goal function and the evaluated values of the second goal function.

33. An apparatus according to claim 32, wherein the prescribed deviation of the output voltage of the SMPS follows a prescribed variation over time.

34. An apparatus according to claim 18, wherein the feedback loop comprises a proportional-integral-derivative (PID) regulator, and the model of the feedback loop models the feedback loop as a PID regulator, the control law parameters comprising the proportional (P), integral (I) and derivative (D) control parameters of the PID regulator.

35. A switched mode power supply, comprising:
a feedback loop that is configured to regulate an output voltage of a switched mode power supply in accordance with a control law defined by control law parameters; and
an apparatus arranged to determine values of the control law parameters for tuning the feedback loop, the apparatus comprising:
a natural frequency estimator circuit configured to determine a respective estimate of a natural frequency of each of two zeros in a transfer function that corresponds to a model of the feedback loop, the natural frequency estimator circuit comprising:
an output voltage deviation determining circuit configured to determine, for each of a plurality of points in a search space, wherein the coordinates of each of the points correspond to candidate values of the natural frequencies of the zeros, a deviation of the output voltage of the SMPS that occurs in response to a variation in a load current of the SMPS; and
a goal function evaluation circuit configured to evaluate a goal function using the determined deviation of the output voltage of the SMPS at each of the plurality of points to obtain a measure of at least one of a size and a recovery time of the respective output voltage deviation,
wherein the natural frequency estimator circuit is configured to estimate a location of a minimum of the goal function in the search space based on the evaluated values of the goal function, the location of the minimum of the goal function corresponding to the natural frequencies of the zeros; and
a control law parameter calculator circuit configured to calculate, based on the determined estimates of the natural frequencies of the zeros, the control law parameter values for tuning the feedback loop.

* * * * *